(12) United States Patent
Hayashi

(10) Patent No.: US 11,022,746 B2
(45) Date of Patent: Jun. 1, 2021

(54) LINEAR LIGHT SOURCE AND PLANAR LIGHT EMITTING DEVICE

(71) Applicant: NICHIA CORPORATION, Anan (JP)

(72) Inventor: Tadao Hayashi, Tokushima (JP)

(73) Assignee: NICHIA CORPORATION, Anan (JP)

(*) Notice: Subject to any disclaimer, the term of this patent is extended or adjusted under 35 U.S.C. 154(b) by 0 days.

(21) Appl. No.: 16/829,787

(22) Filed: Mar. 25, 2020

(65) Prior Publication Data

US 2020/0310019 A1 Oct. 1, 2020

(30) Foreign Application Priority Data

Mar. 28, 2019 (JP) .............................. JP2019-063442

(51) Int. Cl.
*F21V 8/00* (2006.01)

(52) U.S. Cl.
CPC ........... *G02B 6/009* (2013.01); *G02B 6/0068* (2013.01); *G02B 6/0073* (2013.01); *G02B 6/0083* (2013.01)

(58) Field of Classification Search
CPC .... G02B 6/009; G02B 6/0073; G02B 6/0083; G02B 6/0068; G02B 6/0028; G02B 6/0023; H01L 33/58; H01L 33/62; F21Y 2115/10
See application file for complete search history.

(56) References Cited

U.S. PATENT DOCUMENTS

| | | | | |
|---|---|---|---|---|
| 8,272,771 B2* | 9/2012 | Arai | ...................... | G02B 6/0068 362/608 |
| 9,022,633 B2* | 5/2015 | Ito | ........................ | G02B 6/0068 362/612 |
| 9,581,748 B2* | 2/2017 | Hyun | .................... | G02B 6/0011 |
| 9,922,963 B2* | 3/2018 | Hung | .................... | H01L 33/508 |
| 10,007,054 B2* | 6/2018 | Kim | ...................... | G02B 6/0073 |
| 10,147,854 B2* | 12/2018 | Shatalov | .............. | H01L 33/0095 |
| 10,591,662 B2* | 3/2020 | Miyashita | ............ | G02B 6/0073 |
| 2010/0208492 A1 | 8/2010 | Sugie et al. | | |
| 2017/0294419 A1* | 10/2017 | Nakabayashi | .......... | H01L 33/56 |
| 2019/0006568 A1 | 1/2019 | Hayashi | | |

(Continued)

FOREIGN PATENT DOCUMENTS

| | | |
|---|---|---|
| JP | H09-293903 A | 11/1997 |
| JP | 2001345007 A | 12/2001 |
| JP | 2008027649 A | 2/2008 |

(Continued)

*Primary Examiner* — Peggy A Neils
(74) *Attorney, Agent, or Firm* — Hunton Andrews Kurth LLP

(57) ABSTRACT

Provided is a linear light source including: a light-transmissive base having a first main surface that has a rectangular shape with long sides and short sides, a second main surface located opposite to the first main surface, a first (long) side surface, and a second (short) side surface; a plurality of light emitting devices, each including a light emitting element, a light-transmissive member and a sealing member. An upper surface of each of the light emitting devices includes an upper surface of the light-transmissive member. A first bonding member bonds the first main surface of the light-transmissive base and the upper surfaces of the light emitting devices. A width of the light-transmissive base is the same as a width of the light emitting devices in a first direction orthogonal to a first side surface of the light-transmissive base.

20 Claims, 14 Drawing Sheets

(56) References Cited

U.S. PATENT DOCUMENTS

| | | | |
|---|---|---|---|
| 2019/0018184 A1 | 1/2019 | Miyashita et al. | |
| 2019/0058095 A1 | 2/2019 | Choi et al. | |

FOREIGN PATENT DOCUMENTS

| | | | |
|---|---|---|---|
| JP | 2009070817 A | 4/2009 | |
| JP | 2009146874 A | 7/2009 | |
| JP | 2009259653 A | 11/2009 | |
| JP | 2018049875 A | 3/2018 | |
| JP | 2019009429 A | 1/2019 | |
| JP | 2019036713 A | 3/2019 | |

\* cited by examiner

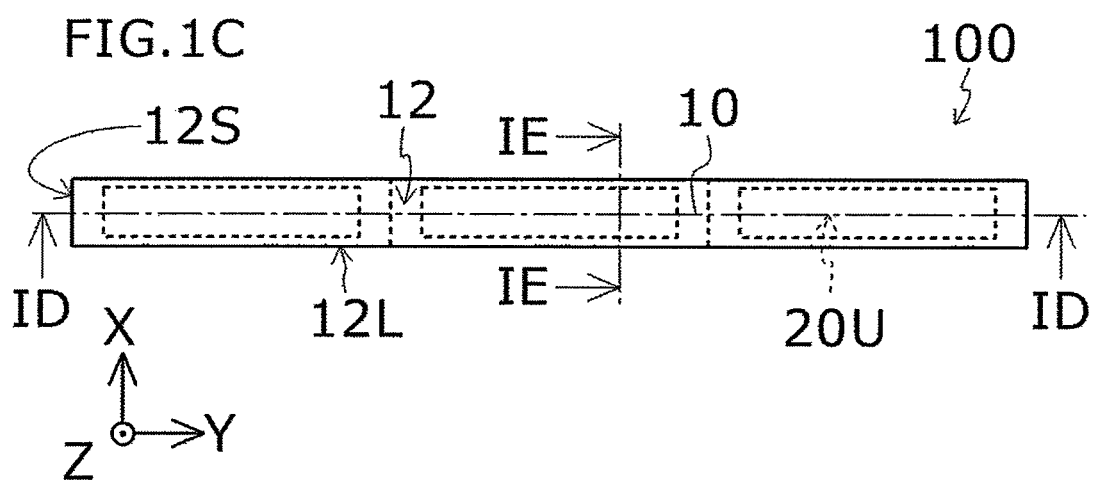

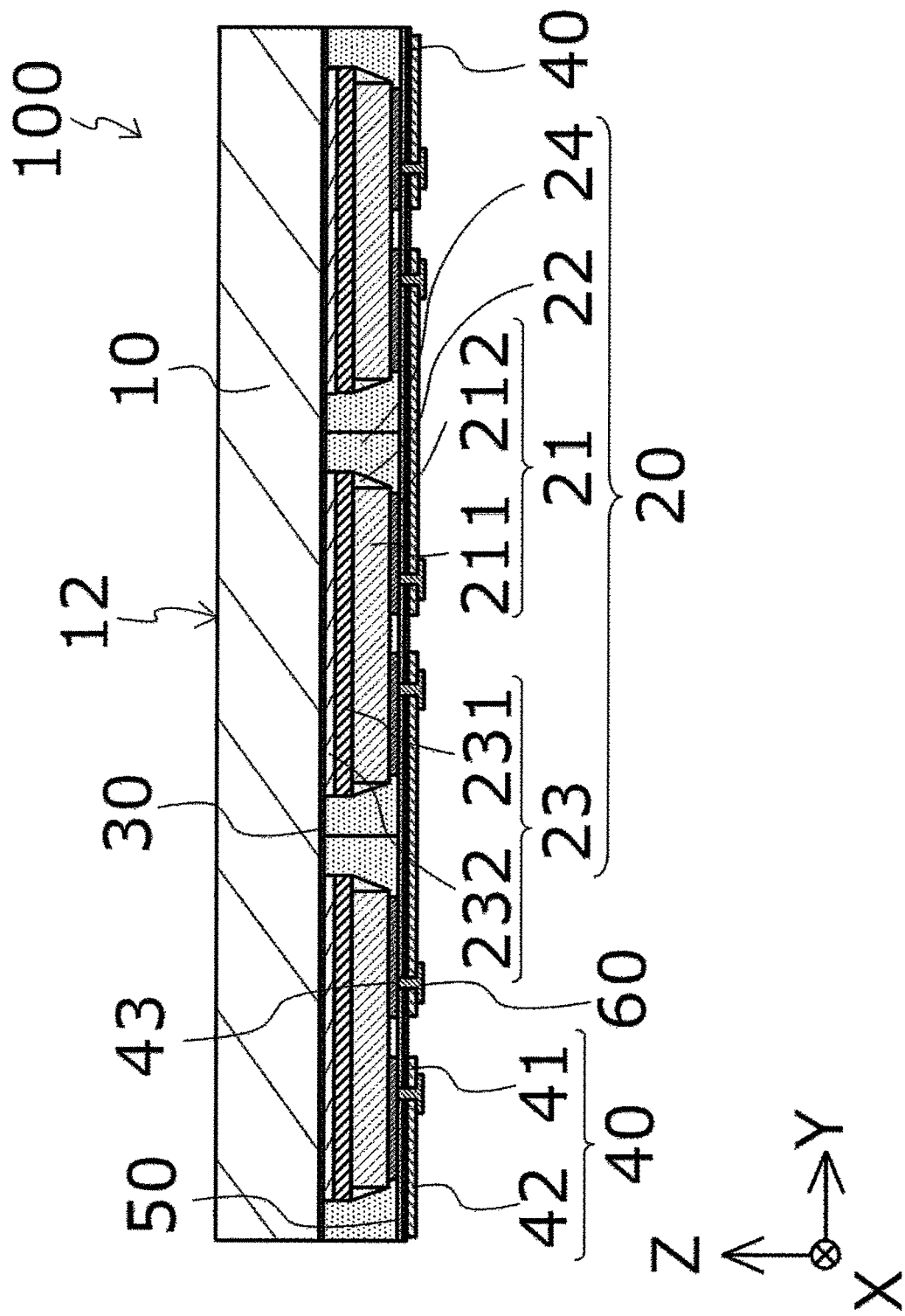

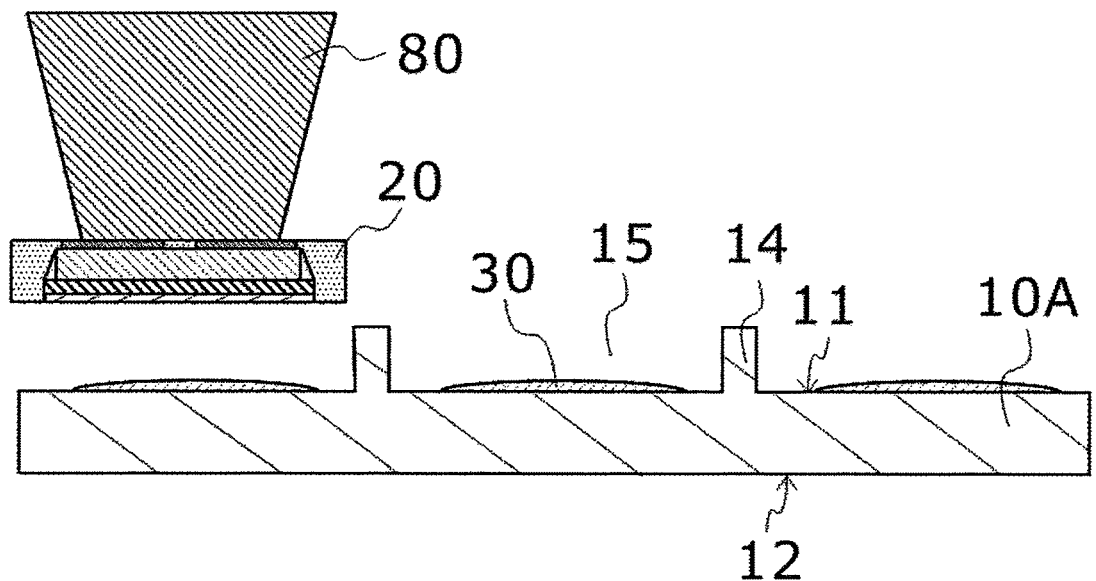
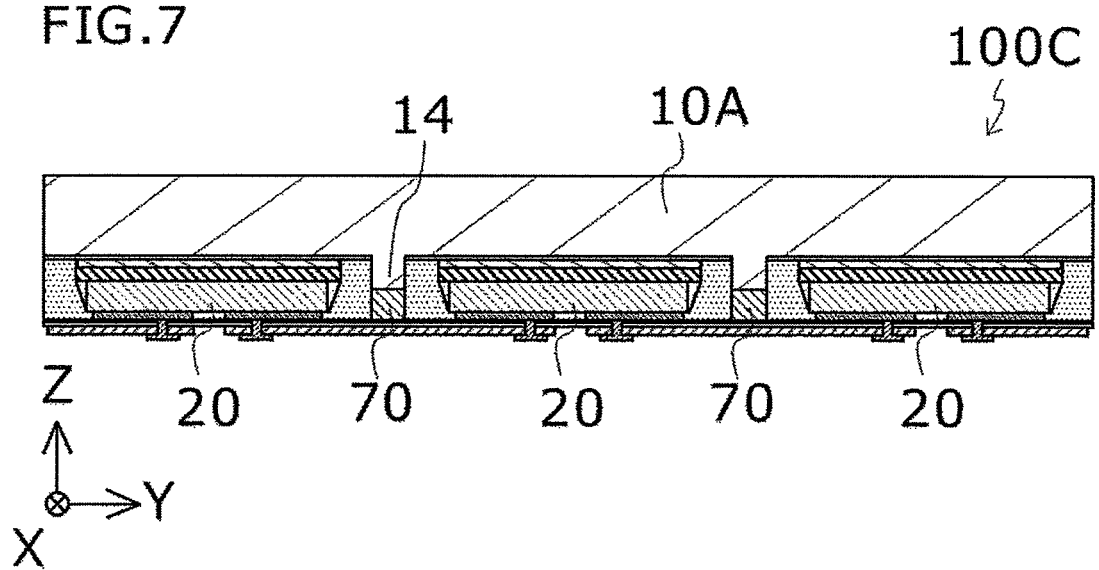

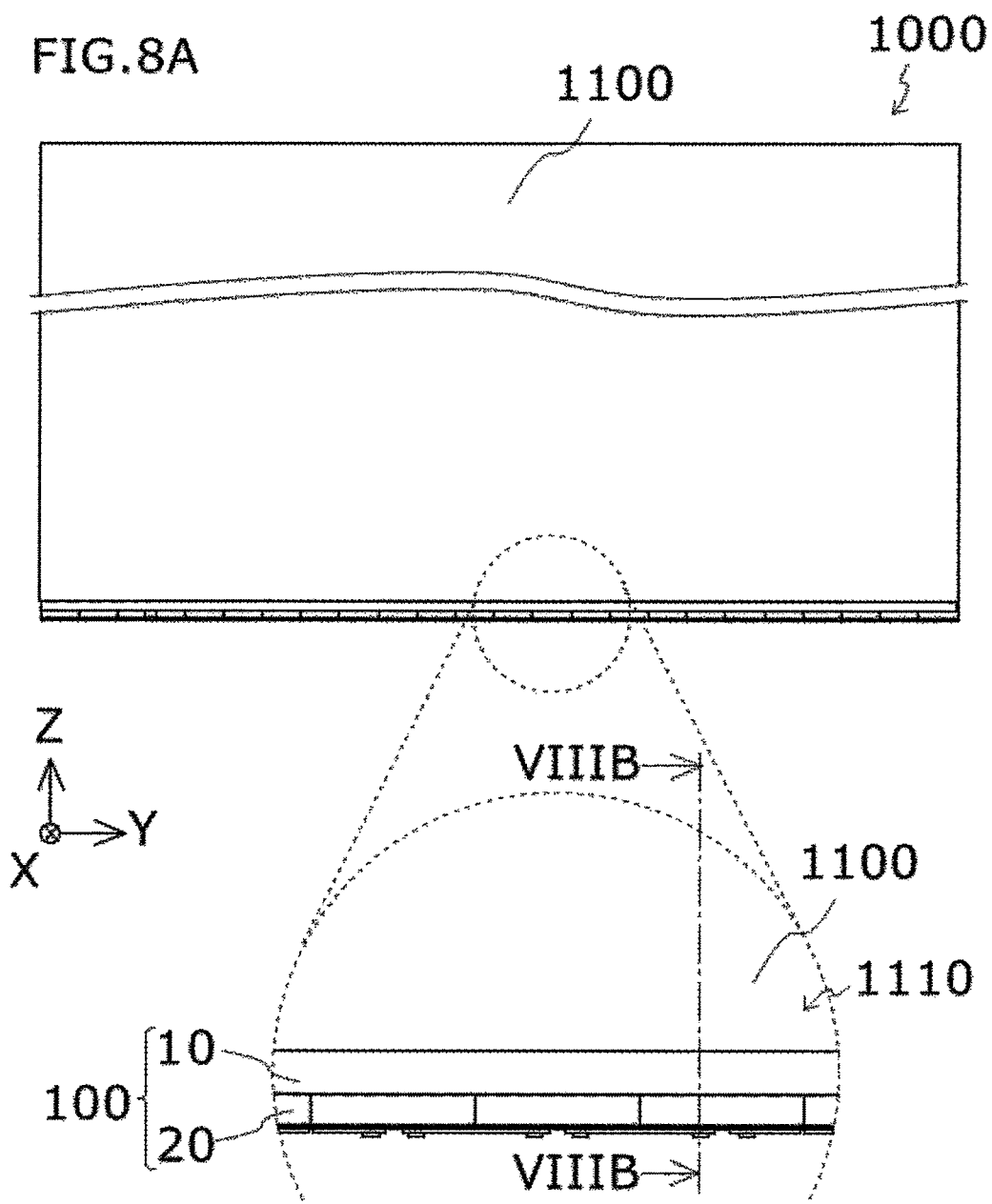

LINEAR LIGHT SOURCE AND PLANAR LIGHT EMITTING DEVICE

CROSS-REFERENCE TO RELATED APPLICATION

This application claims priority to Japanese Patent Application No. 2019-63442, filed on Mar. 28, 2019, the disclosure of which is hereby incorporated by reference in its entirety.

BACKGROUND

Field

The present disclosure relates to a linear light source and a planar light emitting device.

Related Art

As a backlight of a liquid crystal display, an edge-lit planar light emitting device is known which uses a light guide plate and a light source causing light to enter the light guide plate from its side surface (for example, JP 2019-036713 A).

The edge-lit planar light emitting device is desired to be thinned. To produce the liquid crystal display with a narrow frame, the light source disposed on the side surface of the light guide plate is also desired to have a small width in the depth direction from a light emitting surface.

SUMMARY

It is therefore an object of the present disclosure to provide a planar light emitting device with a narrow frame and a light source having a small width in the depth direction.

A linear light source according to the present disclosure has the following configuration.

The linear light source includes:

a light-transmissive base having a first main surface that has a rectangular shape with long sides and short sides, a second main surface located opposite to the first main surface, a first side surface continuous with the long side of the first main surface, and a second side surface continuous with the short side of the first main surface;

a plurality of light emitting devices, each of the light emitting devices including a light emitting element that includes a semiconductor stack and electrodes, a light-transmissive member disposed on a light emitting surface side of the light emitting element, and a sealing member covering a side surface of the light emitting element and a side surface of the light-transmissive member, each of the light emitting devices having an upper surface that has a rectangular shape with long sides and short sides, a lower surface at which the electrode is exposed and being located opposite to the upper surface, a long side surface continuous with the long side of the upper surface, and a short side surface continuous with the short side of the upper surface, wherein the upper surface of each of the light emitting devices includes an upper surface of the light-transmissive member; and a first bonding member that bonds the first main surface of the light-transmissive base and the upper surface of the light emitting device, wherein a width of the light-transmissive base is the same as a width of the light emitting device in a first direction orthogonal to the first side surface of the light-transmissive base.

This makes it possible to provide a linear light source with a small width in the depth direction and a planar light emitting device that can have a narrow frame in the back direction.

BRIEF DESCRIPTION OF THE DRAWINGS

FIG. 1C is a schematic plan view showing an example of the linear light source according to the embodiment.

FIG. 1D is a schematic cross-sectional view taken along the line ID-ID of FIG. 1C.

FIG. 6B is a schematic sectional view showing an example of a manufacturing step of the linear light source according to the embodiment shown in FIG. 6A.

FIG. 7 is a schematic cross-sectional view showing an example of a linear light source according to an embodiment of the present disclosure.

FIG. 8A is a schematic plan view and a partially enlarged schematic plan view showing an example of a planar light emitting device according to an embodiment of the present disclosure.

DETAILED DESCRIPTION

Figure 1A:
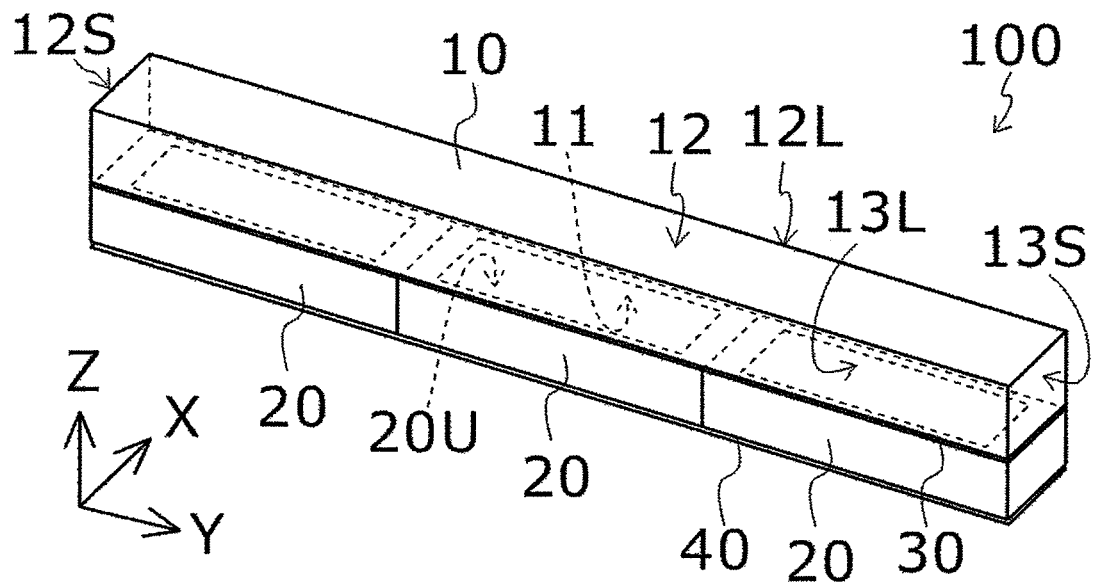
FIG. 1A is a schematic perspective view showing an example of a linear light source according to an embodiment of the present disclosure.

The present disclosure will be described in detail below with reference to the accompanying drawings. In the description below, the terms (e.g., "upper", "lower" and other words, including these words) indicative of specific directions or positions are used as needed. These terms are used for ease of understanding of the present disclosure with reference to the drawings, and they do not limit the technical range of the present disclosure by their meanings. The term "orthogonal" as used in the present disclosure includes the case where two straight lines, sides, planes, and the like are positioned to form an angle therebetween in the range of 90 degrees to ±5 degrees, unless otherwise stated. The term "the same" in length, size, or the like includes the case where the respective values of the lengths, sizes, or the like deviate in the range of about ±10%, unless otherwise stated.

The same or equivalent parts or members are designated by the same reference characters throughout the drawings. Each member is denoted using the same reference character, for example, even when its state, shape, or the like changes before and after curing or cutting.

Embodiments mentioned below are to exemplify a linear light source and a planar light emitting device for embodying the technical idea of the present disclosure, but not to limit the present disclosure to the following. The size, material, shape, relative arrangement and the like of each component mentioned below are not meant to limit the scope of the present disclosure only thereto, unless otherwise specified, and are intended to exemplify the present disclosure only. The contents of the description regarding one embodiment or example can also be applied to other embodiments and examples. Besides, the size, positional relationship, and the like of members shown in the drawings may be exaggerated to clarify the description.

A linear light source according to an embodiment is an elongated linear light source that is usable as a light source of an edge-lit planar light emitting device. The linear light source allows light to enter a light guide plate from its side surface when incorporated in the planar light emitting device. One planar light emitting device can incorporate therein one or more linear light sources.

The linear light source mainly includes a light-transmissive base, light emitting devices, and a wiring board. The light-transmissive base and each light emitting device may be bonded together by a first bonding member. The wiring board and each light emitting device may also be bonded together by a second bonding member. That is, in the linear light source, the light-transmissive base, the first bonding member, the light emitting devices, the second bonding member, and the wiring board may be arranged in this order from the light emission surface side.

The light-transmissive base includes a single light-transmissive member.

The light-transmissive base includes a first main surface with long and short sides, and a second main surface located opposite to the first main surface. The light-transmissive base further includes a first side surface continuous with the long side of the light emission surface and a second side surface continuous with the short side of the light emission surface. The first main surface is the light incident surface on which light from the light emitting device is incident, while the second main surface is the light emission surface from which light is emitted to the outside.

Each of the light emitting devices mainly includes a light emitting element, a light-transmissive member, and a sealing member. The light emitting device does not include a rigid substrate. The light emitting element includes a semiconductor stack and element electrodes. The light-transmissive member may be bonded to a light emission surface of the light emitting element by a light guide member. The sealing member covers the side surfaces of the light emitting element and the side surfaces of the light-transmissive member to expose parts of the element electrodes of the light emitting element. The element electrodes exposed from the sealing member function as electrodes of the light emitting device. Each of the element electrodes exposed from the sealing member may be covered with a conductive layer. The conductive layer may also extend over the sealing member. It is noted that the element electrode or the conductive layer may also be referred to as the electrode of the light emitting device.

The light emitting device comprises an upper surface including an upper surface of the light-transmissive member and a lower surface located opposite to the upper surface and in which the conductive layers are exposed. Each of the upper surface and the lower surface is a rectangle with long and short sides. The light emitting device also includes a pair of long side surfaces continuous with the opposing long sides of the upper surface and a pair of short side surfaces continuous with the opposing short sides of the upper surface.

A first direction is hereinafter defined as the direction orthogonal to a first side surface of the light-transmissive base. The linear light source includes the light-transmissive base bonded to the light emission surfaces of the light emitting devices. The width of the light-transmissive base is the same as the width of the light emitting device in the first direction.

In this way, the light-transmissive base and the light emitting device have the same width in the first direction, thereby making it possible to suppress an increase in the width of the linear light source in the first direction. Further, the plurality of light emitting devices are supported on the light-transmissive base, which can improve the strength of the linear light source even when the strength of each light emitting device itself is low.

The light emitted from each of the plurality of light emitting devices inside the linear light source enters one light-transmissive base to be mixed with light emitted from other light emitting devices therein, and is then emitted to the outside in the form of the mixed light. That is, the light emitted from the linear light source become the mixed light before the linear light sources are incorporated in the planar light emitting device. Thus, the light that has been formed as the mixed light in advance enters a light guide plate from its side surface when the linear light sources are incorporated in the planar light emitting device. Consequently, the linear light source with this configuration emits the light with less luminance unevenness and color unevenness than a linear light source not including any light-transmissive base.

The light emission surface of the linear light source is disposed to face the side surface of the light guide plate in the planar light emitting device. Thus, by suppressing the increase in the width of the linear light source in the first direction, an increase in the length of the side surface of the light guide plate, i.e., the thickness of the light guide plate can also be suppressed. Consequently, the thinned planar light emitting device can be obtained.

Further, by including the light-transmissive base in the linear light source, the wiring board does not need to secure the mechanical strength of the linear light source. Thus, for example, a thin wiring board, such as a flexible substrate, can be used. This makes it possible to reduce the width of the linear light source from the light emission surface in the depth direction (Z direction). When incorporating such a planar light emitting device in a liquid crystal display, the liquid crystal display with a narrow frame can be obtained.

First Embodiment

Figure 1B:
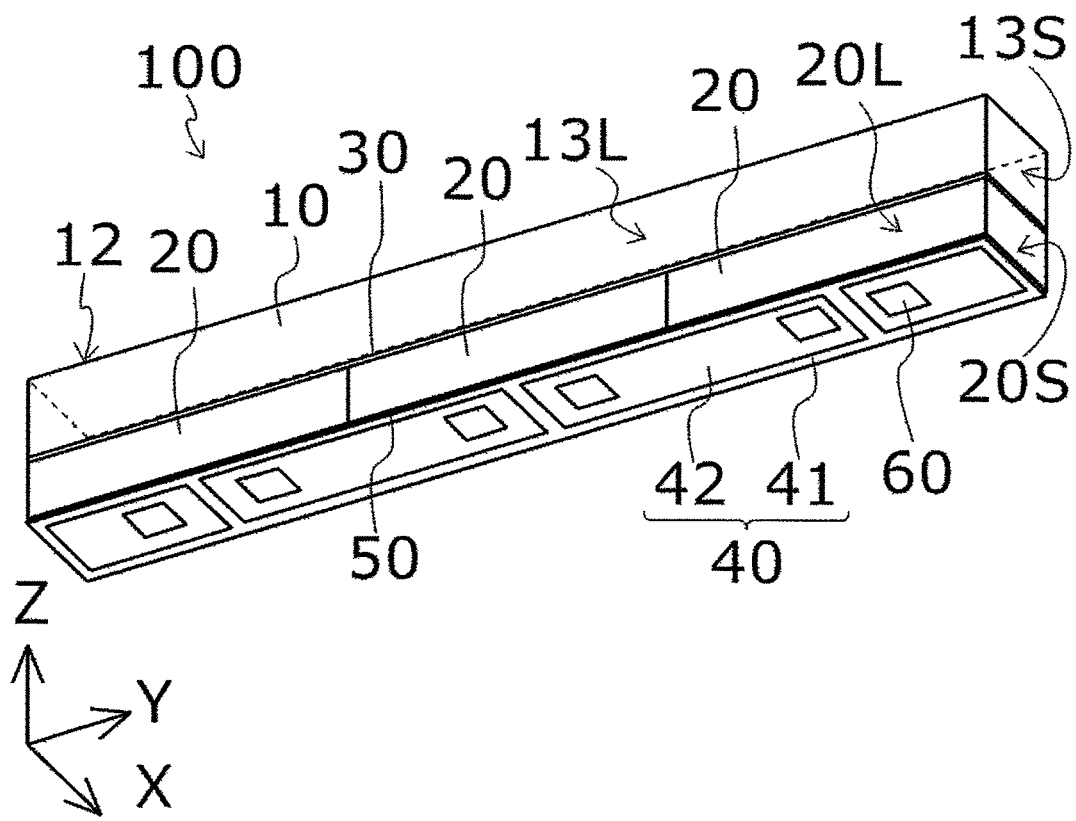
FIG. 1B is a schematic perspective view showing an example of the linear light source according to the embodiment.
Figure 1E:
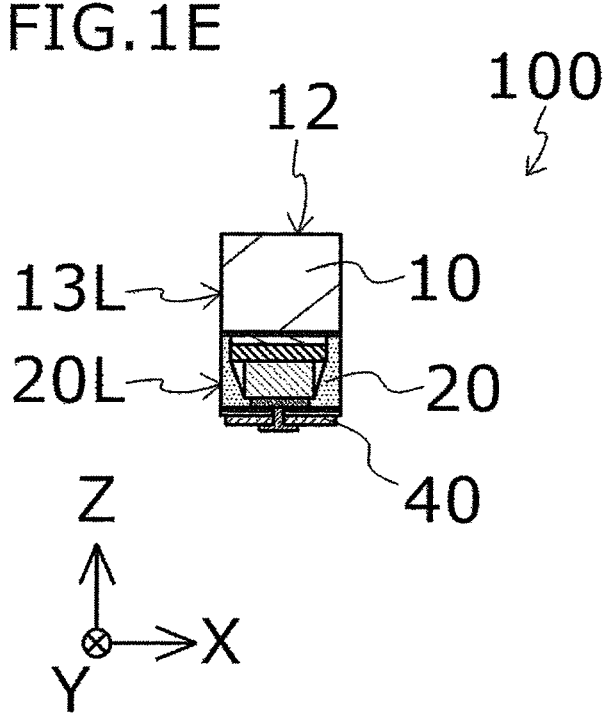
FIG. 1E is a schematic cross-sectional view taken along the line IE-IE of FIG. 1C.

A linear light source according to a first embodiment is shown in FIGS. 1A to 1E. FIGS. 1A and 1B are schematic perspective views of a linear light source 100 according to the present embodiment. FIG. 1C is a schematic plan view of the linear light source 100 according to the present embodiment, FIG. 1D is a cross-sectional view taken along the line IC-IC of FIG. 1C, and FIG. 1E is a cross-sectional view taken along the line IE-IE of FIG. 1C.

The linear light source 100 includes a light-transmissive base 10 and a plurality of light emitting devices 20. Further, the linear light source 100 may also include a wiring board 40. The light-transmissive base 10 and the light emitting device 20 may be bonded together by a first bonding member 30. The light emitting devices 20 and the wiring board 40 may be bonded together by a second bonding member 50. The light emitting device 20 and the wiring board 40 are electrically connected to each other by conductive members 60.

The light-transmissive base 10 has a rectangular first main surface 11 with long sides 11L and short sides 11S and a second main surface 12 located opposite to the first main surface 11. Further, the light-transmissive base 10 also includes first side surfaces (long side surface) 13L continuous with the respective long sides 11L of the first main surface 11 and second side surfaces (short side surfaces) 13S continuous with the respective short sides 11S of the first main surface 11. The width of the light-transmissive base 10 is the same as the width of the light emitting device 20 in the first direction orthogonal to the first side surface 13L of the light-transmissive base 10. Furthermore, in the first embodiment, the light emitting device 20 is in contact with an adjacent light emitting device 20.

In the linear light source 100 according to the first embodiment, the width of the light-transmissive base 10 is the same as the width of the light emitting device 20 in the first direction orthogonal to the first side surface 13L of the light-transmissive base 10. By including the light-transmissive base 10 on the light emission surface side, the width of the linear light source 100 from the light emission surface in the depth direction (Z direction) can be reduced.

In the linear light source 100 according to the first embodiment, since the adjacent light emitting devices 20 are arranged in contact with each other, the intensity of light emitted from the light emission surface (the second main surface 12 of the light-transmissive base 10) of the linear light source 100 is more likely to become uniform. Moreover, this arrangement enables high light output and uniform light emission at a shorter distance, compared to a case where the light emitting devices 20 are arranged spaced apart from each other. Therefore, the present embodiment can provide the planar light emitting device that achieves a liquid crystal display with a narrower frame.

The first direction is the same direction as the X direction shown in FIG. 1A. A second direction or Y direction is defined as the direction parallel to the first side surface 13L and along the longitudinal direction of the light-transmissive base 10 (orthogonal to the second side surface 13S). A third direction or Z direction is defined as the direction orthogonal to the first main surface 11.

In the plurality of light emitting devices 20 included in the linear light source 100, at least two adjacent light emitting devices 20 may be in contact with each other. For example, 50% or more of the plurality of light emitting devices 20 are preferably in contact with the adjacent light emitting devices 20, and all the light emitting devices 20 are more preferably in contact with the adjacent light emitting devices 20. At least parts of the short side surfaces 20S on the upper surface (light emission surface) 20U side, among the facing short side surfaces 20S of the adjacent light emitting devices 20, are preferably in contact with each other. That is, the upper surfaces (light emission surfaces) 20U of the light emitting devices 20 are preferably continuously disposed at the first main surface (incident surface) of the light-transmissive base 10. The light emitting devices which are not spaced apart from each other intentionally, but disposed so as to be in contact with each other in terms of the design while having a slight gap therebetween within the tolerance substantially fall within the scope of the first embodiment.

In the first embodiment, the first bonding member 30 that bonds the light-transmissive base 10 and the light emitting devices 20 can be continuously disposed to be in contact with the plurality of light emitting devices 20. That is, instead of disposing one of a plurality of first bonding members 30 for each of the light emitting devices 20, only one first bonding member 30 can be assigned to the plurality of light emitting devices 20. This makes it possible to simplify a step of forming the first bonding member 30 in the manufacturing process of the linear light source 100. The first bonding member 30 also has the function of guiding light from the light emitting devices 20 to the light-transmissive base 10 and is disposed continuously, which can reduce loss of the light between the light emitting devices 20. The first bonding member 30 may have a size capable of bonding at least two light emitting devices 20. The first bonding member 30 preferably has a size capable of bonding all the light emitting devices 20.

Each member will be described in detail below. It is noted that the following members have the configurations common to the respective embodiments, particularly unless otherwise specified.

(Light-Transmissive Base)

The light-transmissive base 10 is a member that guides light from the light emitting devices 20 to emit it to the outside. That is, the light-transmissive base 10 is also a member that forms the light emission surface of the linear light source 100.

The light-transmissive base 10 is a member that also functions as a support for supporting the plurality of light emitting devices 20. Thus, the strength of the linear light source 100 can be improved by the light-transmissive base 10 even in the light emitting device 20 that does not include a rigid substrate, such as that made of a glass epoxy resin or a BT resin.

The light-transmissive base 10 is a longitudinal member having the length thereof in the second direction (Y direction) that is longer than the length of the upper surface (light emission surface) 20U of the light emitting device 20. The length of the light-transmissive base 10 can be appropriately selected in accordance with the purpose and application, and further the size of the planar light emitting device and the like.

The light-transmissive base 10 can be, for example, a substantially rectangular parallelepiped. Specifically, as shown in FIG. 1A and the like, the light-transmissive base 10 has a rectangular second main surface 12 with long sides 12L and short sides 12S, and a rectangular first main surface 11 located opposite to the second main surface 12. Further, the light-transmissive base 10 has two first side surfaces 13L continuous with the respective long sides 12L of the second main surface 12, and two second side surfaces 13S continuous with the respective short sides 12S of the second main surface 12.

The first main surface 11 of the light-transmissive base 10 is a surface that is bonded to the upper surfaces (light emission surfaces) 20U of the light emitting devices 20. The first main surface 11 of the light-transmissive base 10 has a length that allows the plurality of light emitting devices 20 to be disposed along the second direction (Y direction), which is the longitudinal direction of the first main surface 11. For example, when the upper surface (light emission surface) 20U of the light emitting device 20 is a rectangle with 1 mm×0.3 mm, the first main surface 11 of the light-transmissive base 10 can have a short side of 0.3 mm and a long side of 2 mm to 40 cm (on the assumption that one linear light source covers a 17-inch monitor at the maximum, while a plurality of linear light sources are used to cover a larger monitor).

The second main surface 12 of the light-transmissive base 10 is a surface forming a light emission surface of the linear light source 100. That is, the second main surface 12 is a surface that is disposed to face the side surface (light incident surface) of the light guide plate when the linear light source 100 is incorporated in the planar light emitting device.

The second main surface 12 of the light-transmissive base 10 is a rectangle with long sides 12L and short sides 12S. When the light-transmissive base 10 is a rectangular parallelepiped, the long side of the first main surface 11 and the long side of the second main surface 12 have the same length, while the short side of the first main surface 11 and the short side of the second main surface 12 have the same length. The length of the short side 12S on the second main surface 12 of the light-transmissive base 10 is substantially the same as the length of the light emitting device 20 in the first direction.

Each surface of the light-transmissive base 10 can be a flat surface. The first main surface 11 and the second main surface 12 are preferably parallel to each other. The two first side surfaces 13L are preferably parallel to each other. The two second side surfaces 13S may be parallel to each other. The first main surface 11 and the second main surface 12 preferably have substantially the same size and shape. However, the first main surface 11 and the second main surface 12 are not limited thereto and may have different sizes or shapes.

The two first side surfaces 13L preferably have substantially the same size and shape. However, these two first side surfaces 13L are not limited thereto and may have different sizes or shapes. The two second side surfaces 13S preferably have substantially the same size and shape. However, these two second side surfaces 13S are not limited thereto and may have different sizes or shapes.

The light-transmissive base 10 is preferably formed using a light-transmissive member capable of transmitting 80% or more of the light emitted from the light emitting element 21 in the light emitting device 20. In particular, the light-transmissive base is preferably made of only a light-transmitting material to be mentioned later. Thus, the light from the light emitting devices 20 can be efficiently emitted to the outside through the light-transmissive base 10.

The light-transmissive base 10 is preferably formed using a material that has a refractive index higher than that of a light-transmissive member 23 of the light emitting device 20. Thus, the light from the light emitting devices 20 can efficiently enter the light-transmissive base 10. The refractive index of the light-transmissive base 10 can be, for example, in a range of 1.4 to 1.7.

The light-transmissive base 10 is preferably formed using a material that has higher rigidity than the light emitting device 20. Thus, the strength of the linear light source 100 can be improved even in its configuration where the light emitting devices 20 do not include substrates with high rigidity, i.e., rigid substrates or the like. Further, by including the light-transmissive base 10 with high rigidity, the linear light source can reduce the probability of breakage of the light emitting device 20. The rigidity of the light-transmissive base 10 can be set to exhibit, for example, a flexural modulus of elasticity of 1000 to 10000 MPa.

Moreover, the light-transmissive base 10 is preferably formed using a material that has a coefficient of linear expansion close to the coefficient of linear expansion of the light emitting device 20. The coefficient of linear expansion of the light-transmissive base 10 can be, for example, 4 to $50 \times 10^{-5}/°$ C. This makes it possible to reduce warpage of the linear light source 100.

Examples of the material usable for the light-transmissive base 10 include resin materials, such as thermoplastic resins and thermosetting resins, and optically transparent materials such as glass. Examples of the thermoplastic resins include acrylic resins, polycarbonates, cyclic polyolefins, polyethylene terephthalate, polyesters, and the like, whereas examples of the thermosetting resins include epoxy resins, silicone resins, and the like. In particular, the thermoplastic resin material is preferred because it can be used to efficiently produce the light-transmissive base 10 by injection molding. Among them, a polycarbonate is preferred because of its high transparency and low cost.

Such a light-transmissive base 10 may be prepared by molding using a mold tool or the like or by purchase.

(Light Emitting Device)

Figure 3A:
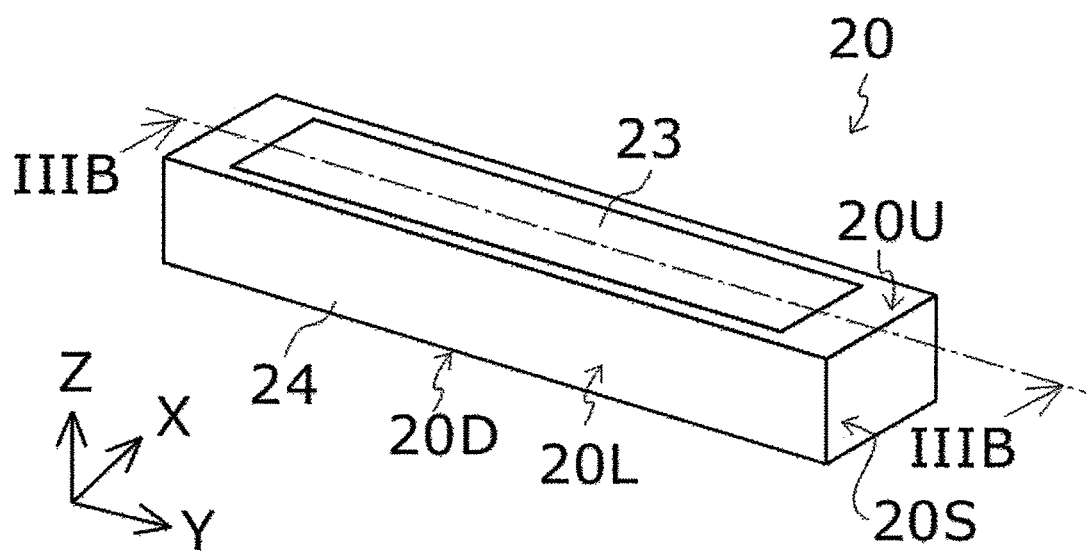
FIG. 3A is a schematic perspective view showing an example of a light emitting device used for the linear light source according to an embodiment.
Figure 3B:
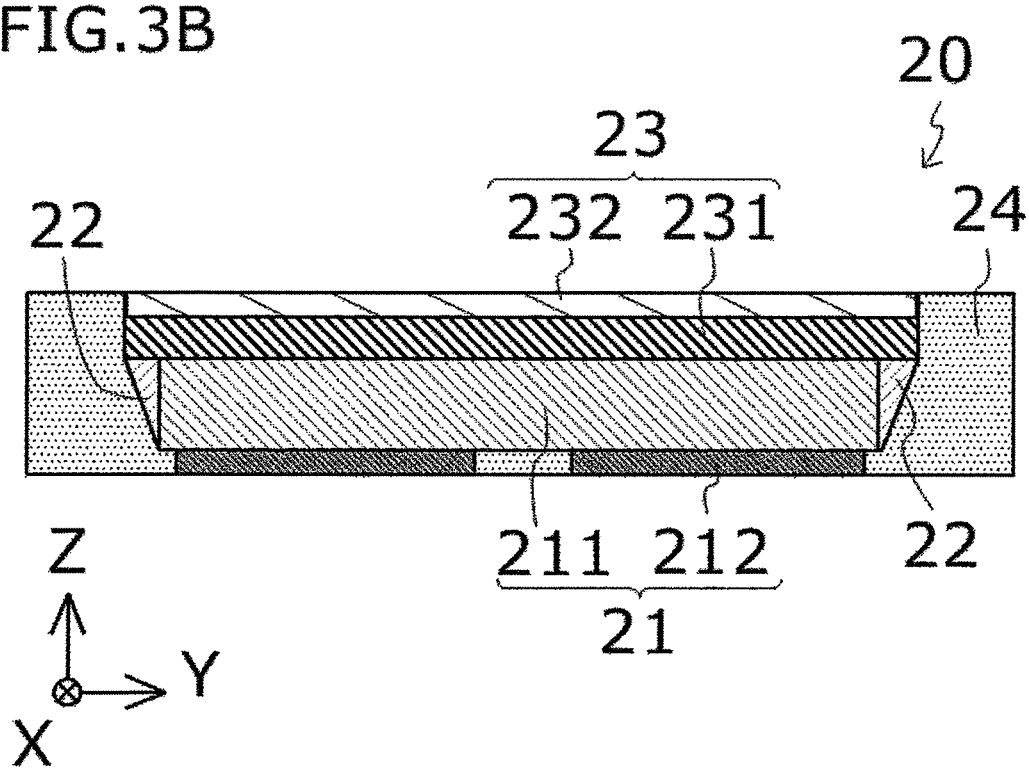
FIG. 3B is a schematic cross-sectional view taken along the line IIIB-IIIB of FIG. 3A.

The light emitting device 20 is a member that functions as a light source of the linear light source 100. FIGS. 3A and 3B show an example of the light emitting device 20. The light emitting device 20 includes the light emitting element 21, the light-transmissive member 23, and a sealing member 24. The light emitting device 20 can be, for example, a substantially rectangular parallelepiped as shown in FIG. 3A. Specifically, the light emitting device 20 includes a rectangular upper surface 20U with long sides and short sides, and a rectangular lower surface 20D located opposite to the upper surface 20U.

The upper surface 20U and the lower surface 20D of the light emitting device 20 have substantially the same size and shape. The upper surface 20U of the light emitting device 20 includes the upper surface of the light-transmissive member 23 and an upper surface of the sealing member 24 surrounding the light-transmissive member 23. The upper surface 20U of the light emitting device 20 is also a light emission surface of the light emitting device 20. The lower surface 20D of the light emitting device 20 includes electrodes (element electrodes) 212 and the sealing member 24 surrounding the element electrodes 212. The lower surface 20D of the light emitting device 20 is also an electrode formation surface of the light emitting device 20.

The light emitting device 20 has two long side surfaces 20L continuous with the respective long sides of the upper surface 20U, and two short side surfaces 20S continuous with the respective short sides of the upper surface 20U. The two long side surfaces 20L have substantially the same size and shape. The two short side surfaces 20S have substantially the same size and shape. The long side surface 20L and the short side surface 20S of the light emitting device 20 are formed of only the sealing member 24.

A plurality of such light emitting devices 20 are provided in one linear light source 100. FIG. 1A and the other figures exemplify the linear light source 100 that includes three light emitting devices 20. The respective light emitting devices 20 may have the same size, or some or all of these light emitting devices 20 may have different sizes. The respective light emitting devices 20 preferably have the same size. Each light emitting device 20 can include one or two light emitting elements 21. The respective colors of light emitted from the light emitting devices 20 may be the same or different. For example, the color of light emitted from each light emitting device 20 can be one of white, blue, green, and red. Alternatively or additionally, a light emitting device 20 that emits ultraviolet light can be used.

The light emitting element 21 of the light emitting device 20 includes a semiconductor stack 211 and the element electrodes 212. The light emitting element 21 may utilize a known semiconductor light emitting element. For example, a light-emitting diode may be used as the light emitting element 21. The light emitting element 21 mainly has a light emitting surface 211U from which the emitted light is extracted, and an electrode formation surface 211D opposite to the light emitting surface 211U. The pair of element electrodes 212 are disposed on the same surface side of the light emitting element 21.

The light emitting element 21 may include, for example, the semiconductor stack 211 that includes a light-transmissive substrate, such as a sapphire substrate, and semiconductor layers stacked on the light-transmissive substrate. It is noted that the semiconductor stack 211 may not include a light-transmissive substrate. The semiconductor stack 211 includes a light emitting layer, and an n-type semiconductor layer and a p-type semiconductor layer that sandwich the light emitting layer therebetween. An n-side electrode and a p-side electrode, which are the element electrodes 212, are electrically connected to the n-type semiconductor layer and the p-type semiconductor layer, respectively.

The light emitting element 21 may selectively utilize an element that emits light with an arbitrary wavelength. For example, a light emitting element that uses a nitride-based semiconductor ($In_xAl_yGa_{1-x-y}N$, $0 \leq X$, $0 \leq Y$, $X+Y \leq 1$) may be used as the element that emits blue or green light. The emission wavelength of the light emitting element may be selected from a variety of available emission wavelengths depending on the material of the semiconductor layers and the mixed crystal ratio thereof. The composition, emission color, size, the number of the light emitting elements used, and other factors thereof may be selected as appropriate in accordance with the purpose. In a case where the light emitting device 20 includes a wavelength conversion member, the light emitting element 21 preferably includes a nitride-semiconductor ($In_xAl_yGa_{1-x-y}N$, $0 \leq X$, $0 \leq Y$, $X+Y \leq 1$), which is capable of emitting light with a short wavelength that can efficiently excite the wavelength converting member.

The light emitting surface 211U of the light emitting element 21 is preferably a rectangle in the planar view. The size of the light emitting element 21 may be, for example, 200 μm to 2,000 μm on the long side, 200 μm×500 μm on the short side in the planar view, and 200 μm to 800 μm in thickness.

The light-transmissive member 23 of the light emitting device 20 is a member that forms the light emission surface 20U of the light emitting device 20, and is exposed on the upper surface 20U of the light emitting device 20. The light-transmissive member 23 may be directly bonded to the light emitting surface 211U of the light emitting element 21 or may be bonded to the light emitting surface 211U of the light emitting element 21 via a light guide member 22 mentioned later.

The light-transmissive member 23 has such translucency that transmits light from at least the light emitting element 21. The light-transmissive member 23 transmits 60% or more and preferably 90% or more of the light emitted from the light emitting element 21. As the material of the light-transmissive member 23, light-transmissive, thermosetting resin materials, such as epoxy resins and silicone resins may be used. The thickness of the light-transmissive member 23 is, for example, 100 μm to 200 μm.

The light-transmissive member 23 may contain a wavelength conversion member that converts the light from the light emitting element 21 into light with a different wavelength, in addition to the above-mentioned light-transmissive material. The light-transmissive member 23 may be formed of a single layer, or may have a stacked structure that includes a stack of multiple layers. For example, a first light-transmissive member 231 containing the wavelength conversion member and a second light-transmissive member 232 substantially not containing the wavelength conversion member may be stacked on each other. FIG. 3B exemplifies the light-transmissive member 23 that has the stacked structure in which the first light-transmissive member 231 containing the wavelength conversion member is disposed on the side (lower side) close to the light emitting element 21, and the second light-transmissive member 232 substantially not containing the wavelength conversion member is stacked on the first light-transmissive member 231.

One wavelength conversion member may contain one or more kinds of phosphors. Examples of the phosphor include a YAG phosphor, a β sialon phosphor, and fluoride-based phosphors, such as a KSF-based phosphor. The plurality of kinds of phosphors may be mixed together or stacked in use. The wavelength conversion member may contain, for example, a β-sialon phosphor that emits greenish light and a fluoride phosphor, such as a KSF-based phosphor, that emits reddish light as phosphors, while using the light emitting element 21 that emits bluish light. The use of two kinds of such phosphors makes it possible to expand the color reproduction range of the linear light source 100 and the planar light emitting device using the same. The phosphor may be composed of quantum dots.

The phosphor particles may be located in the wavelength conversion member in any way. For example, the phosphor particles may be substantially evenly distributed or may be partially unevenly distributed within the wavelength conversion member.

The first light-transmissive member 231 containing the wavelength conversion member may further contain light diffusion material. The light diffusion material includes, for example, microparticles made of $SiO_2$, $TiO_2$, $Al_2O_3$, ZnO or the like.

The light guide member 22 is a member that bonds the light emitting element 21 and the light-transmissive member 23. The light guide member 22 has such translucency that transmits 60% or more and preferably 90% or more of the light emitted from the light emitting element 21. For this reason, the light guide member 22 may contain a diffusion member or the like, but may be composed of only the light-transmissive resin material that does not contain the diffusion member or the like.

The light guide member 22 may cover side surfaces of the light emitting element 21 (each surface connecting the light emitting surface 211U and the electrode formation surface 211D). Thus, the light emitted from the side surfaces of the light emitting element 21 can be efficiently extracted into the light guide member 22, thereby enhancing the light extraction efficiency of the linear light source 100.

As the material of the light guide member 22, a light-transmissive, thermosetting resin materials, such as epoxy resins and silicone resins, may be used.

The sealing member 24 of the light emitting devices 20 is a member that protects the light emitting element 21 and covers the side surfaces of the light emitting element 21. The sealing member 24 does not cover the lower surfaces of the element electrodes 212 in the light emitting element 21. Specifically, the sealing member 24 is disposed to cover the lower surface of the semiconductor stack 211 in the light emitting element 21 and the side surfaces of the element electrodes 212 in the light emitting element 21.

The sealing member 24 preferably covers the side surfaces of the light-transmissive member 23. Further, when the light guide member 22 is provided for bonding the light emitting element 21 and the light-transmissive member 23, the sealing member 24 preferably covers the side surfaces of the light guide members 22. The sealing member 24 is preferably disposed to integrally cover the side surfaces of the light emitting element 21 or the light guide member 22 and the side surfaces of the light-transmissive member 23. However, the sealing member covering the side surfaces of the light emitting element 21 or the light guide member 22 and the sealing member covering the side surfaces of the light-transmissive member 23 may be separate bodies depending on a manufacturing method thereof.

The sealing member 24 has a reflectance of 60% or more and preferably 90% or more for the light emitted from the light emitting element 21. The material of the sealing member 24 is preferably resin material containing white pigments or the like. In particular, a silicone resin or an epoxy resin containing titanium oxide is preferred.

The light emitting device may further include a conductive layer. In the light emitting device 20 shown in FIG. 3B which does not include a conductive layer, the lower surfaces of the element electrodes 212 are exposed from the sealing member 24. That is, the element electrodes 212 are also electrodes of the light emitting device 20. In contrast, in the light emitting device 20A shown in FIG. 3C, the lower surfaces of the element electrodes 212 are exposed from the sealing member 24, but not exposed to the outside and are covered with the conductive layer 25. For example, when the element electrode 212 of the light emitting element 21 is made of a material that is susceptible to oxidation, such as copper (Cu), the oxidation of the element electrode 212 can be suppressed by covering the element electrode with the conductive layer 25 made of a metal material which is less susceptible to oxidation than the material of the element electrode. The light emitting devices 20A with such a conductive layer 25 may be also used in the linear light source 100 and the planar light emitting device.

The conductive layer 25 may have a size that covers only the element electrode 212 exposed from the sealing member 24. Alternatively, the conductive layer 25 may have a size that covers both the element electrode 212 and the sealing member 24. In particular, the conductive layer 25 is preferably formed on the sealing member 24 as well, in order to be electrically connected to the wiring board to be mentioned later. Thus, the area of an electrically conductive region can be increased, thus making it easier to establish electric continuity in the light emitting device 20. Further, the electric resistance of the light emitting device can be reduced. The conductive layer 25 may extend to the end of the lower surface 20D of the light emitting device 20 or may be spaced apart from the end thereof.

The conductive layer 25 may be a single layer or may have a stacked structure in which a plurality of layers are stacked. Examples of the material of the conductive layer 25 include Ti, Ni, Cu, Al, Ag, Au, Ru, and Pt. When the conductive layer has the stacked structure, for example, it can be formed by stacking a Ti layer, a Ni layer and an Au layer in this order. The thickness of the conductive layer 25 can be in a range of 0.01 μm to 3 μm. Such a conductive layer 25 can be formed by sputtering, vapor deposition, printing, plating, laser transfer, or the like.

(First Bonding Member)

The first bonding member 30 is a light-transmissive member that bonds the light-transmissive base 10 and the light emitting devices 20. The first bonding member 30 also has a function of propagating the light emitted from the light emitting device 20 to the light-transmissive base 10.

The first bonding member 30 has such translucency that transmits 60% or more and preferably 90% or more of the light emitted from the light emitting device 20. The first bonding member 30 is preferably made of a material that has substantially the same refractive index as the material of the light-transmissive base 10 or the light-transmissive member 23 of the light emitting device 20. As the material of the first bonding member 30, light-transmissive materials, such as epoxy resins, silicone resins, or mixed resins thereof can be used.

(Wiring Board)

The wiring board 40 includes wiring portions 42 connected to an external power source and an insulating base material 41 holding the wiring portion 42. The wiring portion 42 can be provided, for example, on one or both sides of the base material 41. When the base material 41 has the stacked structure, the wiring portion 42 may be provided to be sandwiched between the base materials 41. In an example shown in FIG. 1D, the wiring board 40 includes the wiring portions 42 on one surface (the lower surface only) of the base material 41. The wiring portion 42 exposed to the outside, except for a portion thereof electrically connected to the external power source, may be coated with an insulating protective member or the like, which is separately provided from the base material.

The wiring board 40 is bonded to the lower surface 20D side of the light emitting device 20 using the second bonding member 50. The wiring board 40 can have the same size as the light-transmissive base 10. Alternatively, the wiring board 40 can be larger than the light-transmissive base 10. For example, when a flexible substrate is used as the wiring board 40 by using the wiring board 40, which is longer than the light-transmissive base 10, in the second direction (Y direction), a portion of the wiring board 40 that extends beyond an end of the light-transmissive base 10 (a portion that does not overlap the light-transmissive base 10 in the planar view) can be deformed into a desired shape to be connected to the external power source. Thus, the portion of the wiring board 40 that does not overlap the light-transmissive base 10 may extend from the end of the light-transmissive base 10 in the second direction as mentioned above, or may extend from an arbitrary position on the side of the first side surface 13L of the light-transmissive base 10.

The material of the base material 41 in the wiring board 40 may use, for example, resins. Specific examples of the material can include phenolic resins, epoxy resins, polyimide resins, BT resins, polyphthalamide (PPA), polyethylene terephthalate (PET), unsaturated polyesters, glass epoxy, composite resins thereof, and the like.

The wiring portion 42 of the wiring board 40 is, for example, a conductive foil (conductive layer) provided on the base material 41, and is electrically connect to a plurality of light emitting devices. The material of the wiring portion 42 preferably has high thermal conductivity. Examples of such a material include a conductive material such as copper. The wiring portion 42 can be formed by plating, coating of a conductive paste, printing, or the like, and the thickness of the wiring portion 42 is in a range of, for example, about 5 to 50 µm.

(Second Bonding Member)

The second bonding member 50 is a member that bonds the wiring board 40 and the light emitting devices 20. Examples of the material usable in the second bonding member 50 include resins, such as epoxy resins or silicone resins, and mixed resins thereof.

The second bonding member 50 can be formed by printing, spraying, dispensing, or the like. The second bonding member 50 may be provided as an adhesive layer on one surface of the wiring board 40 in advance.

(Conductive Member)

The conductive members 60 is a member that electrically connects the light emitting device 20 and the wiring board 40. Specifically, the conductive member 60 is disposed to be in contact with both the electrodes (element electrode 212 or conductive layer 25) of the light emitting devices 20 and the wiring portion 42 of the wiring board 40.

When the electrodes (the element electrodes 212 or the conductive layer 25) of the light emitting device 20 and the wiring portion 42 of the wiring board 40 are disposed to face each other, the electrodes (the element electrodes 212 or the conductive layer 25) and the wiring portion 42 are bonded together by disposing solder, silver paste, or the like therebetween.

The conductive member 60 may be disposed only inside a through hole 43, and/or may be provided to extend to the surface of the wiring portion 42 around the through hole 43. In the conductive member 60 shown in FIG. 1D, the width of the part provided on the lower surface of the wiring board 40 is wider than the width in the through hole 43.

Examples of the material of the conductive member 60 include Ag paste, Au paste, Pt paste, Pd paste, Cu paste, carbon paste, mixtures thereof, and the like.

Such a linear light source can be obtained by a manufacturing method, which mainly includes the following steps of:

(1) preparing a light-transmissive base;
(2) preparing a light emitting device;
(3) disposing a first bonding member on the light-transmissive base;
(4) bonding the light emitting devices onto the first bonding member; and
(5) bonding a wiring board onto a light emitting devices.

Each step of the manufacturing method of the linear light source 100 according to the present embodiment will be described with reference to the accompanying drawings.

(1) Step of Preparing Light-Transmissive Base

First, the light-transmissive base 10 is prepared. Specifically, the light-transmissive base 10 can be formed by, for example, injection molding, transfer molding, thermal transfer, or the like. Alternatively, the light-transmissive base 10 may be prepared by purchase. A light-transmissive base that has a size suitable for use in one linear light source 100 may be prepared as the light-transmissive base 10. Alternatively, the light-transmissive base 10 may be prepared by providing a light-transmissive base that has a size with the width or length to cover a plurality of linear light sources 100 and then cutting it at any stage in the manufacturing process. FIGS. 2A to 2G illustrate the case of using the light-transmissive base 10 that has a size to cover one linear light source 100 as an example.

(2) Step of Preparing Light Emitting Device

The light emitting devices 20 shown in FIGS. 3A and 3B is prepared. Such a light emitting device 20 can be manufactured and prepared, for example, through some or all steps shown in FIGS. 4A to 4H. Alternatively, the light emitting device 20 may be purchased and prepared.

Figure 4A:
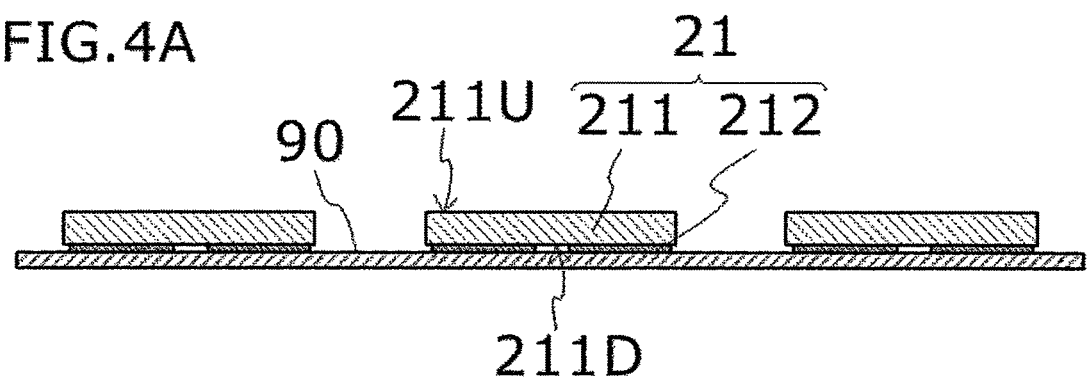
FIG. 4A is a schematic cross-sectional view showing an example of a manufacturing step of the light emitting device used in the linear light source according to the embodiment.

First, a plate or sheet-shaped support 90 is prepared. Here, the support 90 that has a size capable of mounting a plurality of light emitting elements 21 thereon is prepared. As shown in FIG. 4A, a plurality of light emitting elements 21 are disposed on the support 90 at certain intervals. At this time, the element electrodes 212 of each light emitting element 21 are disposed to face the support 90. The light emitting element 21 is preferably fixed on the support 90 by using an adhesive. The support 90 provided with the adhesive may be prepared beforehand.

Figure 4B:
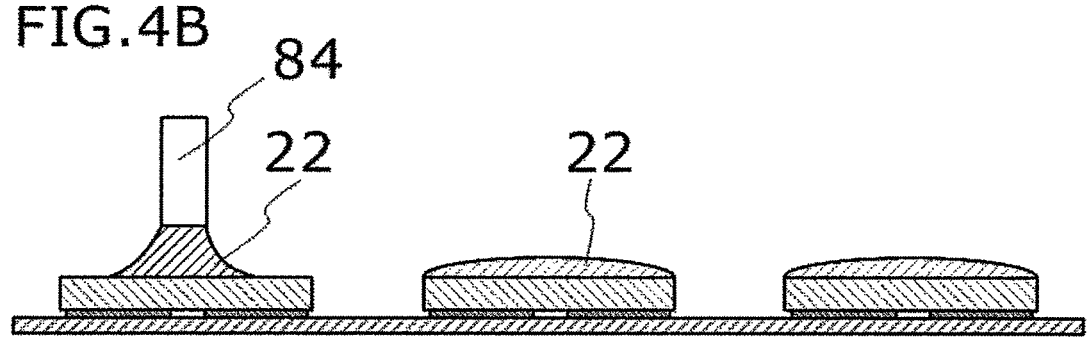
FIG. 4B is a schematic cross-sectional view showing an example of a manufacturing step of the light emitting device used in the linear light source according to the embodiment.

Then, as shown in FIG. 4B, the light guide member 22 is disposed on each light emitting element 21. For example, a method of disposing the light guide member 22 includes discharging a liquid light guide member 22 using a dispenser nozzle 84 to dispose the light guide member 22 on the light emitting element 21 as shown in FIG. 4B. Other methods, such as pin transfer and printing, can also be used. Here, an example is shown in which the light guide member 22 is disposed only on the upper surface of each light emitting element 21. However, the light guide member 22 may be disposed onto the side surfaces of the light emitting element 21 as well as the upper surface thereof.

Figure 4C:
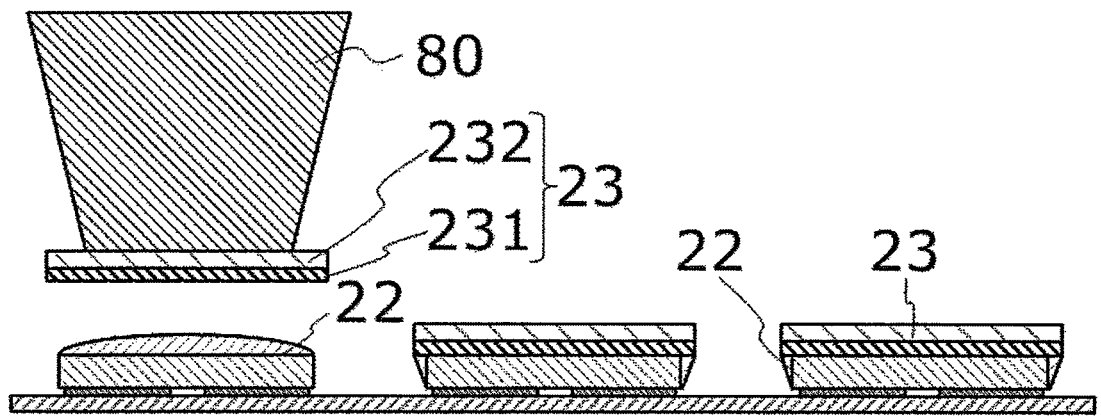
FIG. 4C is a schematic cross-sectional view showing an example of a manufacturing step of the light emitting device used in the linear light source according to the embodiment.

Then, as shown in FIG. 4C, the light-transmissive member 23 is placed on each light guide member 22. Here, a method is exemplified in which the light-transmissive member 23 formed in advance is adsorbed by using a collet 80 and placed on the corresponding light emitting element 21. The light-transmissive member 23 used here has the stacked structure which includes the first light-transmissive member 231 containing a phosphor and the second light-transmissive member 232 substantially not containing any phosphor, as illustrated in the figure by way of example. When using the light-transmissive member 23 with such a stacked structure, the light-transmissive member 23 is placed on the light emitting element 21 with the first light-transmissive member 231 facing the light emitting element 21 side.

Figure 4D:
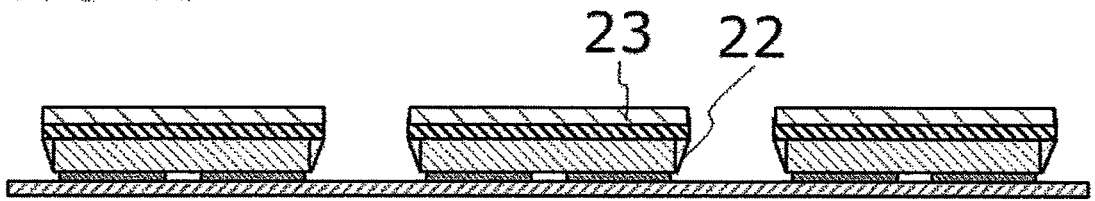
FIG. 4D is a schematic cross-sectional view showing an example of a manufacturing step of the light emitting device used in the linear light source according to the embodiment.

The light guide member 22 may be protruded laterally from a gap between the light emitting element 21 and the light-transmissive member 23 by being sandwiched between the upper surface of the light emitting element 21 and the light-transmissive member 23 and pressed from above. Consequently, as shown in FIG. 4D, the light guide member 22 is formed to cover the side surfaces of the light emitting element 21.

Figure 4E:
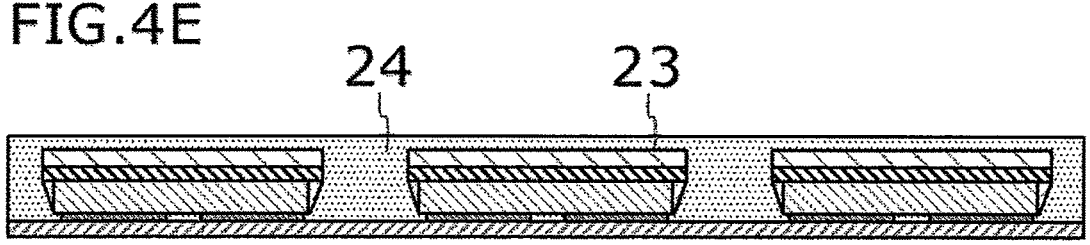
FIG. 4E is a schematic cross-sectional view showing an example of a manufacturing step of the light emitting device used in the linear light source according to the embodiment.

Then, as shown in FIG. 4E, the sealing member 24 is formed to cover and embed the upper surfaces of the light-transmissive members 23 on the light emitting elements 21. Methods of forming the sealing member 24 can include, for example, injection molding, transfer molding, compression molding, printing, potting, spraying, and the like.

Figure 4F:
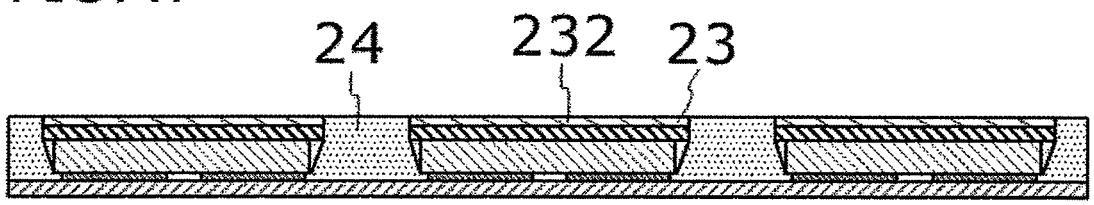
FIG. 4F is a schematic cross-sectional view showing an example of a manufacturing step of the light emitting device used in the linear light source according to the embodiment.

Then, as shown in FIG. 4F, a superficial part of the sealing member 24 is removed to expose the light-transmissive members 23 therefrom. At this time, parts of the light-transmissive members 23 may also be removed together. Herein, an example is illustrated in which parts of the second light-transmissive members 232 are removed. This step can be omitted in a case where the sealing member 24 is formed not to embed therein the upper surfaces of the light-transmissive members 23 in the step of forming the sealing member 24. Examples of the method of removing the sealing member 24 can include grinding using a grindstone, cutting with a cutting tool, and blasting.

Figure 4G:
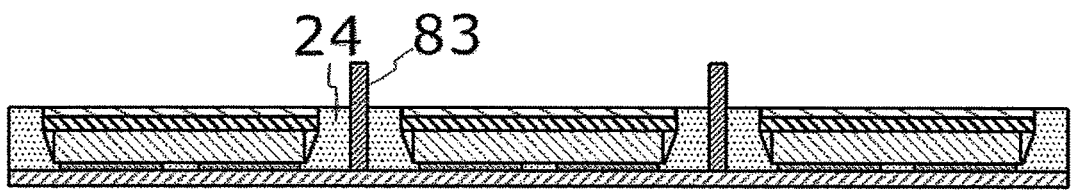
FIG. 4G is a schematic cross-sectional view showing an example of a manufacturing step of the light emitting device used in the linear light source according to the embodiment.
Figure 4H:
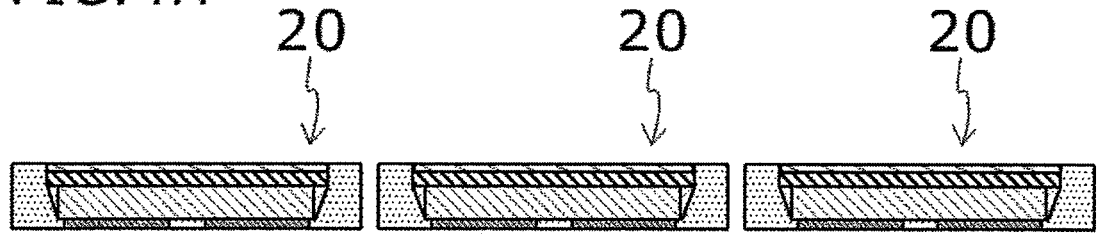
FIG. 4H is a schematic cross-sectional view showing an example of a manufacturing step of the light emitting device used in the linear light source according to the embodiment.

Then, as shown in FIG. 4G, a portion of the sealing member 24 between the adjacent light emitting elements 21 is cut using a cutting blade 83, whereby the small-sized light emitting devices 20, into which the wafer has been singulated, can be obtained as shown in FIG. 4H.

Figure 3C:
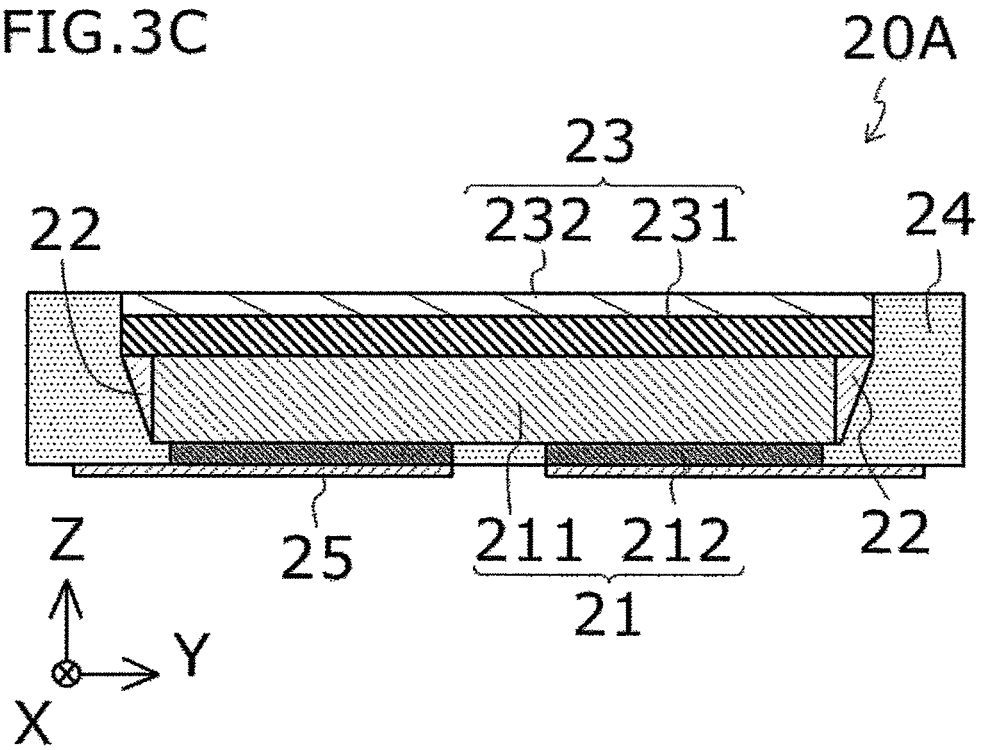
FIG. 3C is a schematic diagram showing an example of the light emitting device used in the linear light source according to the embodiment.

For the light emitting device 20A having the conductive layer 25 as shown in FIG. 3C, for example, after the step of exposing the light-transmissive member 23 from the sealing member 24 as shown in FIG. 4F, another support is attached to the light-transmissive member 23 side, followed by removing the support 90 located on the element electrode 212 side, and then the step of forming the conductive layer 25 is performed.

(3) Step of Disposing First Bonding Member on Light-Transmissive Base

Here, returning to FIG. 2B, the explanation will be continued. The first bonding member 30 is disposed on the prepared light-transmissive base 10. A method of disposing the first bonding member 30 includes, for example, printing, spraying, potting, or the like of a liquid first bonding member 30. As the first bonding member 30, a preformed adhesive sheet may be attached.

(4) Step of Bonding Light Emitting Devices onto First Bonding Member

Figure 2A:
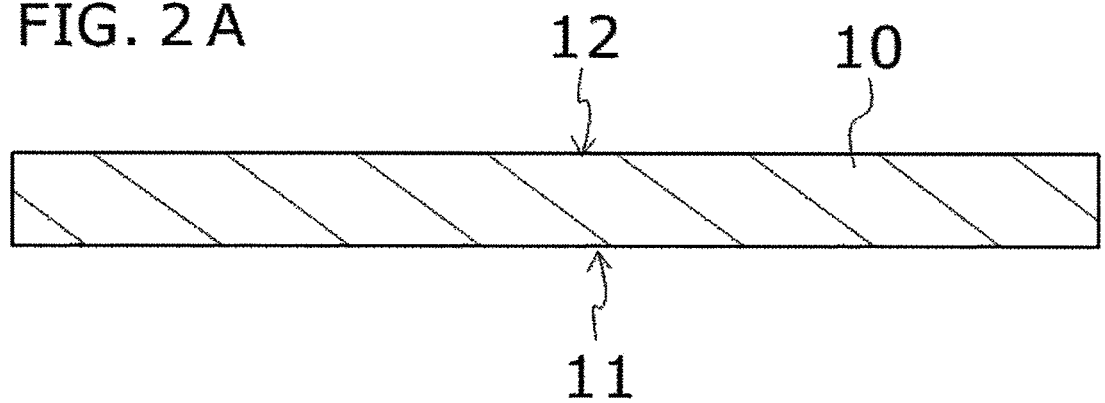
FIG. 2A is a partially enlarged schematic cross-sectional view showing an example of a manufacturing step of a linear light source.
Figure 2B:
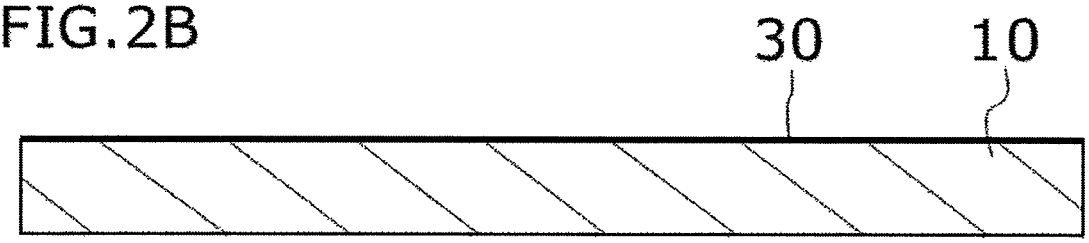
FIG. 2B is a partially enlarged schematic cross-sectional view showing an example of a manufacturing step of the linear light source.
Figure 2C:
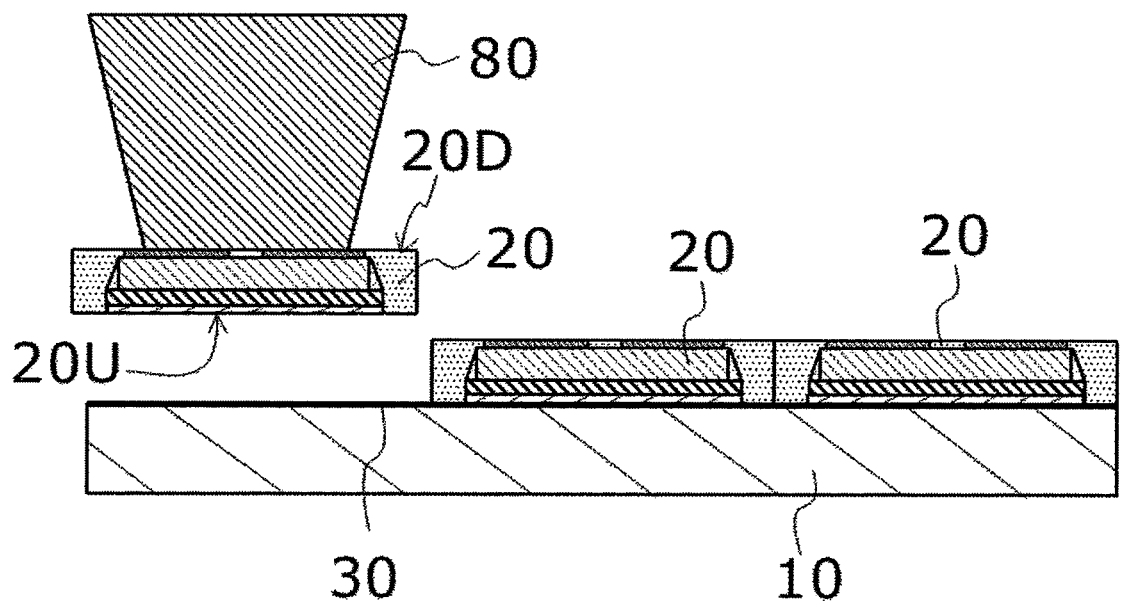
FIG. 2C is a partially enlarged schematic cross-sectional view showing an example of a manufacturing step of the linear light source.
Figure 2D:
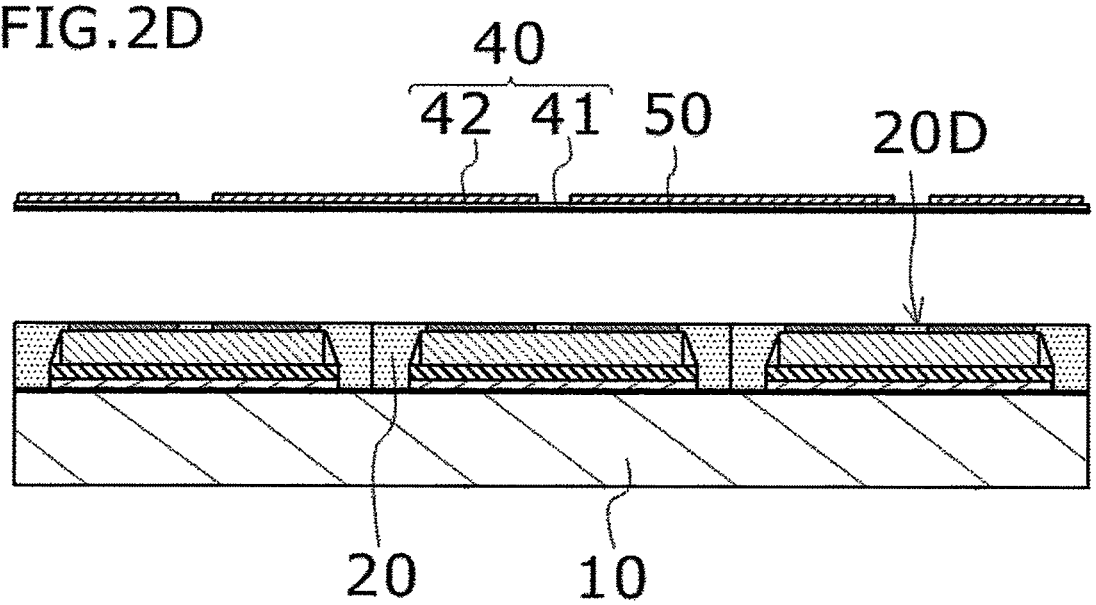
FIG. 2D is a partially enlarged schematic cross-sectional view showing an example of a manufacturing step of the linear light source.

Then, as shown in FIG. 2C, the light emitting devices 20 are disposed and bonded onto the first bonding member 30. At this time, the first bonding member 30 and the upper surface (the light emission surface) 20U of each light emitting device 20 are disposed to face each other. The light emitting devices 20 may be disposed by arranging a guide member that has a height greater than that of the long side surface 13L, along the long side surface 13L of the light-transmissive base 10 so that the light emitting devices 20 can be easily arranged in alignment.

(5) Step of Bonding Wiring Board onto Light Emitting Devices

Then, the wiring board 40 is prepared. In an example shown in FIG. 2D, the wiring board 40 includes the wiring portions 42 on only one surface of the base material 41. Here, an example is shown in which the wiring board 40 not including any through hole is prepared and then the second bonding member 50 is previously bonded to the surface of the wiring board 40 that is not provided with the wiring portion 42.

Figure 2E:
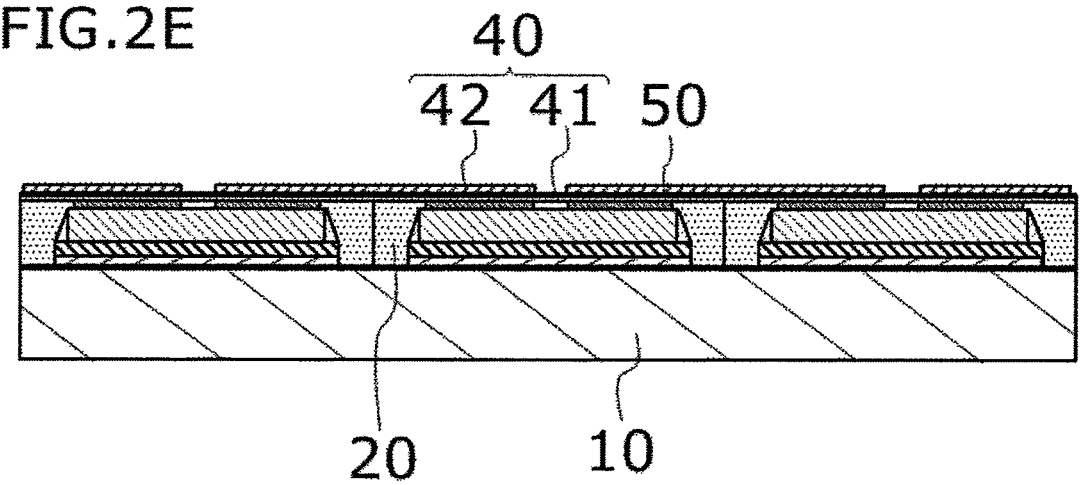
FIG. 2E is a partially enlarged schematic cross-sectional view showing an example of a manufacturing step of the linear light source.

As shown in FIG. 2E, the light emitting devices 20 are bonded onto the prepared wiring board 40 via the second bonding member 50. At this stage, the electrodes (element electrodes 212 or conductive layers 25) of the light emitting devices 20 are not electrically connected to the wiring portions 42 on the wiring board 40.

It is noted that a wiring board with the through holes formed in advance can be prepared as the wiring board 40 by purchase or the like. Alternatively, the wiring board 40 with through holes may be prepared by providing the wiring board 40 with no through hole through purchase or the like and then forming through holes therein.

Figure 2F:
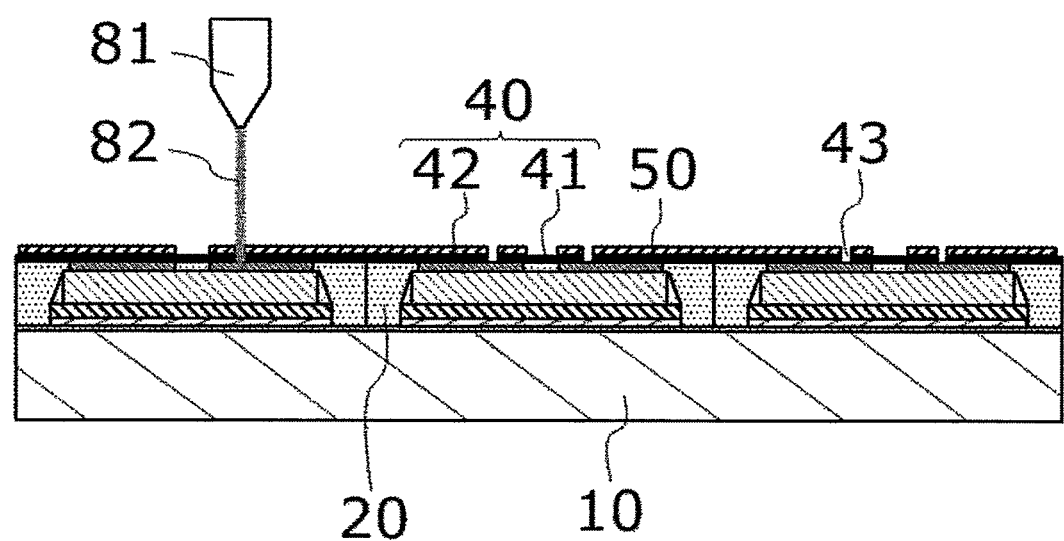
FIG. 2F is a partially enlarged schematic cross-sectional view showing an example of a manufacturing step of the linear light source.

Then, as shown in FIG. 2F, through holes 43 are formed to pass through the wiring board 40 (wiring portions 42 and the base material 41) and the second bonding member 50. The position of each through hole 43 corresponds to the position where the electrode (element electrode 212 or conductive layer 25) of the light emitting device 20 is disposed. Methods of forming the through hole 43 can include, for example, laser light irradiation, drilling, and the like. FIG. 2F shows an example in which the through hole 43 is formed by irradiating the wiring board 40 with laser light 82 from a laser light source 81. In the case of using the wiring board 40 that has the through holes in advance, the step of forming the through holes can be omitted at this stage.

Figure 2G:
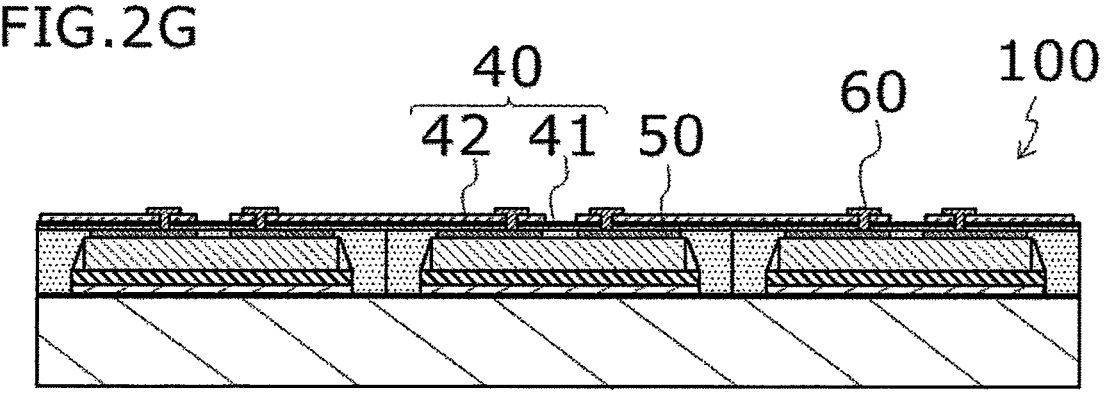
FIG. 2G is a partially enlarged schematic cross-sectional view showing an example of a manufacturing step of the linear light source.

Then, as shown in FIG. 2G, the conductive member 60 is disposed in each through hole 43. A method of disposing the conductive member 60 is, for example, printing.

In the way mentioned above, the linear light source 100 can be obtained.

Second Embodiment

Figure 5:
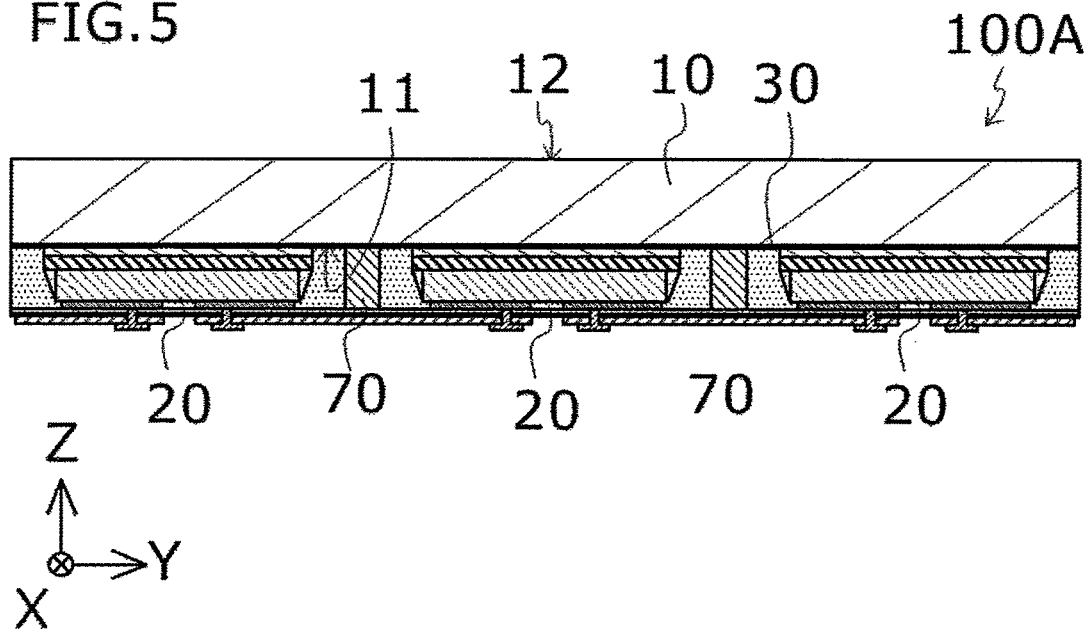
FIG. 5 is a schematic cross-sectional view showing an example of a linear light source according to an embodiment of the present disclosure.

A linear light source according to a second embodiment is shown in FIG. 5.

In a linear light source 100A according to the second embodiment, a light-transmissive base 10 is also provided on the light emission surface side. This makes it possible to reduce the width of the linear light source 100A in the depth direction (Z direction) from the light emitting surface thereof. The width of the light-transmissive base 10 is the same as the width of the light emitting device 20 in the first direction (the X direction) orthogonal to the first side surface of the light-transmissive base 10. The linear light source 100A is the same as the linear light source 100 of the first embodiment in terms of using the rectangular parallelepiped-shaped light-transmissive base 10, but differs from the linear light source 100 of the first embodiment in that a plurality of light emitting devices are arranged spaced apart from each other. Differences from the first embodiment will be mainly described below.

The linear light source 100A according to the second embodiment can decrease the number of light emitting devices 20, compared to the linear light source 100 of the first embodiment, because the plurality of light emitting devices 20 are arranged spaced apart from each other. Thus, the linear light source 100A can be produced at low cost. Further, by decreasing the number of the light emitting devices 20, the linear light source 100A can be reduced in weight. By disposing the light emitting device 20 while being spaced apart from the adjacent light emitting device 20, for example, the light emitting devices 20 can be less likely to be deformed or damaged, for example, even when the light-transmissive base 10 expands or contracts due to heat generated during driving.

All the plurality of light emitting devices 20 included in the linear light source 100A may be arranged spaced apart at equal intervals, or some or all of them may be arranged spaced apart at different intervals. Preferably, all the light emitting devices are disposed such that they are spaced at equal intervals.

The spacing between the adjacent light emitting devices 20 may be appropriately selected in accordance with the size and light distribution characteristics of the light emitting device 20, the size of the light-transmissive base 10, the brightness required for the linear light source 100A, and the like. For example, in the linear light source 100A shown in FIG. 5, the light emitting devices 20 are arranged at a spacing of about 10% of the width of the light emitting device 20. The light emitting devices 20 are not limited to this arrangement, but may be arranged at a spacing of, for example, 5% to 200% of the width of the light emitting device 20. It is noted that the first embodiment may also include the arrangement of the light emitting devices close to that mentioned in the first embodiment, that is, the arrangement of the light emitting devices 20 with an air layer therebetween as a result of intending to arrange the light emitting device 20 in contact with each other in the manufacturing process without intentionally providing a spacing between them.

In the second embodiment, since the light emitting devices 20 are spaced apart from each other, the air layer or a light reflective member 70 may be disposed in a region where the light emitting device 20 is not disposed, on the first main surface 11 of the light-transmissive base 10. Preferably, the light reflective member 70 is disposed on the first main surface 11 between the light emitting devices 20. This can suppress the leakage of light from the first main surface 11 between the light emitting devices 20 even when the light from the light emitting device 20 is incident on the first main surface 11 of the light-transmissive base 10, and then part of the light is reflected by the second main surface 12 and guided to the first main surface 11 side.

Such a light reflective member 70 is preferably disposed to cover at least 50% to 100% of an exposed area of the first main surface 11 of the light-transmissive base 10 between the light emitting devices 20, and more preferably to cover the entire area. In addition, preferably, the side surface of the light emitting device 20 (that faces the adjacent light emitting device 20) is also covered with the light reflective member 70. In this case, the light reflective member 70 preferably covers 50% to 100% of the area of the side surface of the light emitting device 20, and more preferably covers 90% or more of the area thereof. This can suppress the leakage of light emitted out of the light emitting devices 20, from the sealing member 24 even when the thickness of the sealing member 24 of the light emitting device 20 is small.

As shown in FIG. 5, the light reflective member 70 is preferably provided to embed the entire space between the adjacent light emitting devices 20. Thus, the wiring board 40 can be bonded to the light reflective member 70 and thereby can be stably disposed.

The light reflective member 70 has a reflectance of 60% or more and preferably 90% or more for the light emitted from the light emitting device. The material of the light reflective member 70 is preferably a resin material containing white pigments or the like. In particular, a silicone resin containing titanium oxide is preferred. The material of the light reflective member 70 may also be the same as the material of the sealing member 24 in the light emitting device 20.

In the second embodiment, since the light emitting devices 20 are bonded to the light-transmissive base 10 while being spaced apart from each other, the first bonding members 30 can be arranged spaced apart from each other for each light emitting device 20. Alternatively, the first bonding member 30 may be disposed in a size capable of being bonded to a plurality of light emitting devices 20 which are arranged spaced apart from each other. In FIG. 5, the first bonding member 30 continuous with the three light emitting devices 20 is exemplified.

Third Embodiment

Figure 6A:
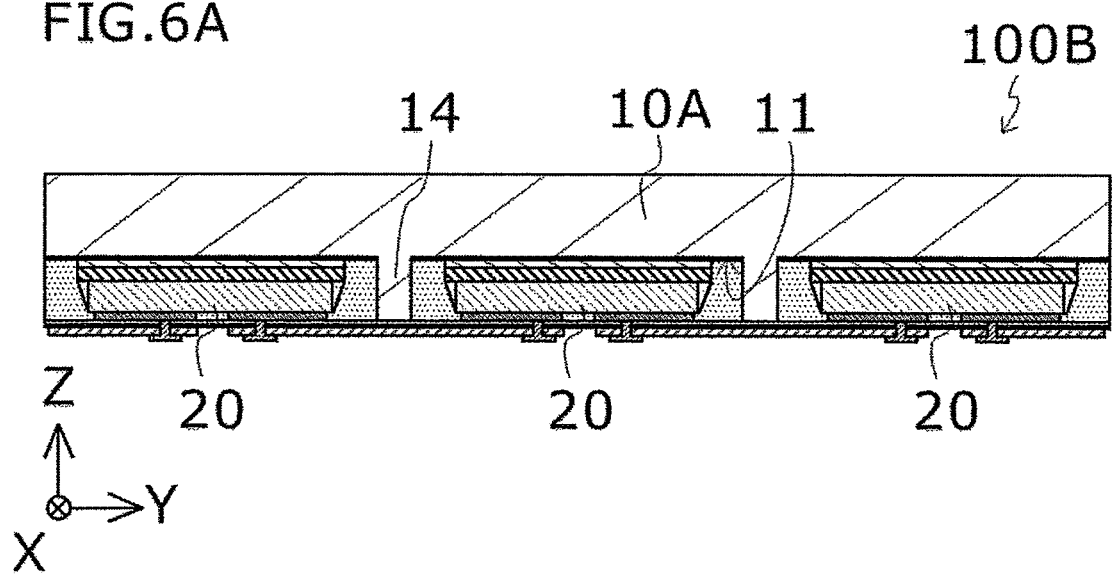
FIG. 6A is a schematic cross-sectional view showing an example of a linear light source according to an embodiment of the present disclosure.

A linear light source according to a third embodiment is shown in FIG. 6A. In a linear light source 100B according to the third embodiment, a light-transmissive base 10A is also provided on the light emission surface side. This makes it possible to reduce the width of the linear light source 100B in the depth direction (Z direction) from the light emission surface thereof. The width of the light-transmissive base 10A is the same as the width of the light emitting device 20 in the first direction orthogonal to the first side surface of the light-transmissive base 10A. The linear light source 100B is the same as the linear light source 100A of the second embodiment in that a plurality of light emitting devices 20 are arranged spaced apart from each other, but differs from the linear light source 100A of the second embodiment in that a part of the light-transmissive base 10A is disposed between the adjacent light emitting devices 20. In other words, the third embodiment differs from the second embodiment in that the light-transmissive base 10A is not a rectangular parallelepiped, and a convex portion 14 protruding from the first main surface 11 with the light emitting devices 20 bonded thereto is disposed between the adjacent light emitting devices 20. Furthermore, in other words, providing the convex portions 14 means that as shown in FIG. 6B, the light-transmissive base 10A is said to have a shape with concave portions 15 while the first main surface 11 is the bottom surface. Hereinafter, a description will be given mainly of points different from other embodiments.

In the linear light source 100B according to the third embodiment, the light-transmissive base 10A includes the convex portions 14, and the light emitting device 20 is disposed on the first main surface 11 between the adjacent convex portions 14. In other words, the light emitting devices 20 are disposed on the first main surface 11 which is the bottom surface of each concave portion 15. The concave portions 15 between the adjacent convex portions 14 are opened at two first side surfaces. That is, the long side surface of the light emitting device 20 disposed in the concave portion 15 is exposed to the outside between the adjacent convex portions 14. The short side surface of the light emitting device 20 is disposed to face the side surface of the convex portion 14.

The first main surface 11, on which the light emitting devices 20 are to be disposed, is divided by the convex portions 14, which makes it easier to recognize the positions on the first main surface 11 of the light-transmissive base 10A where the light emitting devices 20 are to be placed. This enables easy positioning of the light emitting devices 20. FIG. 6B is a diagram showing a step of disposing the light emitting devices 20 on the light-transmissive base 10A using the collet 80. Since the first bonding members 30 are disposed on the respective portions of the first main surface 11, which is the bottom surface of the concave portion 15, the light emitting devices 20 are less likely to be misaligned.

The convex portions 14 of the light-transmissive base 10A are positioned on both sides of each light emitting device 20, so that the light emitting device 20 is sandwiched between the adjacent convex portions 14. This makes it possible to improve the strength of the linear light source 100B. Moreover, when a force from the Z direction is applied to the linear light source 100B, a problem such as peeling between the light-transmissive base 10A and the light emitting device 20 is unlikely to occur.

The width of the convex portion 14 in the first direction (X direction) may be the same as the width of the first main surface 11 or may be smaller than the width of the first main surface 11. The width of the convex portion 14 can be, for example, 10% to 100% of the width of the first main surface 11, and is preferably the same as the width of the first main surface 11.

The widths of all the convex portions 14 in the second direction (Y direction) may be the same, or may be partially or entirely different. Preferably, the widths of the convex portions 14 in the second direction are all the same.

The width of each convex portion 14 in the first direction (X direction) may be set constant across the entire area from the lower end to upper end of the convex portion 14. That is, the side surface (side surface as a part of the first side surface) of the convex portion 14 may be vertical relative to the first main surface 11. Alternatively, the width of the upper end of the convex portion 14 may be smaller than the width of the lower end of the convex portion 14. For example, the width of the upper end of the convex portion 14 may be 90% to 100% of the width of the lower end thereof. In that case, the side surface of the convex portion 14 (side surface as a part of the first side surface) may have a step or may be an inclined surface. When the side surface of the convex portion 14 is the inclined surface, the side surface may be inclined toward the opposing side surface, for example, by 85 degrees to 90 degrees relative to the first main surface 11.

The side surface of the concave portion 15 (the side surface of the convex portion 14) may be vertical to the first main surface 11. Alternatively, the width on the opening side of the concave portion 15 may be larger than the width in the second direction of the first main surface 11, which is the bottom surface of the concave portion 15. In that case, the side surface of the concave portion 15 may have a step or may be an inclined surface. When the side surface of the concave portion 15 is the inclined surface, the side surface may be inclined on the right and left sides of the light emitting element, for example, by 90 degrees to 135 degrees relative to the first main surface 11.

The spacing between the adjacent convex portions 14 in the second direction (Y direction), that is, the width of the concave portion 15 is preferably the same width on the long side surface of one light emitting devices 20. Thus, the light emitting devices 20 may be disposed with high positional accuracy. When the side surface of the concave portion 15 is a stepped surface or an inclined surface, the width of the convex portion 14 and the spacing between the convex portions 14 (the width of the concave portion 15) indicate the spacing between the concave portions 15 and the width of the concave portion 15 at the bottom surface of the concave portion 15, respectively.

The height (depth of the concave portion 15) of the convex portion 14 of the light-transmissive base 10A in the third direction (Z direction) may be, for example, 50% to 100% of the height of the light emitting device 20, and is preferably the same height as the height of the light emitting device 20.

In the third embodiment, the width of the convex portion 14 in the first direction or the width of the convex portion 14 in the second direction may be different from the width of the light emitting device 20. In such a case, the light reflective member 70 may be formed between the side surface of the convex portion 14 (the side surface of the concave portion 15) and the light emitting device 20 or to cover the side surface of the light emitting device on the first main surface 11 side. As the light reflective member 70, a member similar to that used in the second embodiment may be used.

Furthermore, when the height of the convex portion 14 (the depth of the concave portion 15) is lower than the height of the light emitting device 20, the light reflective member 70 may be disposed on the upper surface of the convex portion 14 as in the linear light source 100C shown in FIG. 7, so that the height of the light emitting devices 20 is the same as the height of the light reflective member 70. Thus, the wiring board 40 can be easily disposed, thereby preventing the occurrence of disconnection or the like, and suppressing the absorption of light in the wiring board 40, which can provide the linear light source 100C with high light output.

Fourth Embodiment

Figure 8B:
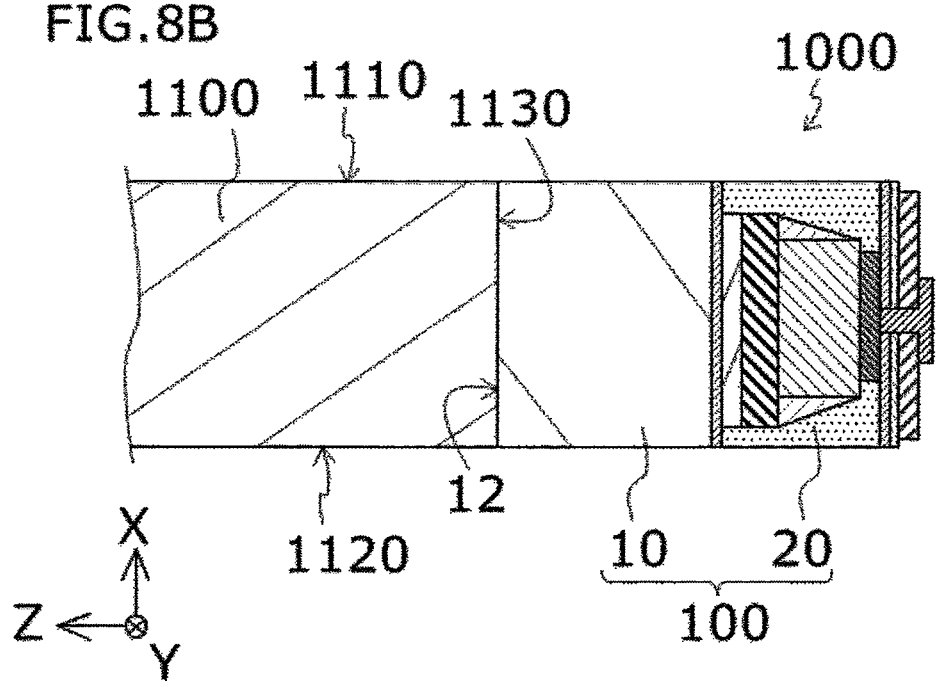
FIG. 8B is a schematic cross-sectional view taken along the line VIIIB-VIIIB of FIG. 8A.

A planar light emitting device according to a fourth embodiment is shown in FIGS. 8A and 8B. The planar light emitting device according to the embodiment mainly includes linear light sources and a light guide plate. As the linear light source, any one of or some of the linear light sources 100, 100A, and 100B mentioned in the first to third embodiments can be used alone or in combination. By providing the linear light sources with the light-transmissive base on the light emission surface side, the planar light emitting device with a narrow frame can be obtained. A planar light emitting device 1000 including the linear light sources 100 of the first embodiment and a light guide plate 1100 will be described below.

Each of the linear light sources 100 is disposed so that light can be incident from a light incident surface 1130 which is a side surface of the light guide plate 1100. That is, the second main surface (light emission surface) 12 of the linear light source 100 and the light incident surface 1130 of the light guide plate 1100 are disposed to face each other.

The light guide plate 1100 is a light-transmissive plate-shaped member, and includes a first plane 1110 serving as a planar light emission surface, and a second plane 1120 opposite to the first plane 1110. The light guide plate 1100 shown in FIG. 8A is substantially rectangular in the planar view. However, the shape of the light guide plate 1100 in the planar view is not limited to this, and may be, for example, a polygon, such as a triangle or a pentagon, or can be a shape which has its part cut out.

The light guide plate 1100 has side surfaces continuous with the first plane 1110 and the second plane 1120. Part or all of the side surfaces may be the light incident surface 1130. For example, when the first plane 1110 has a rectangular shape, the light guide plate 1100 has four side surfaces. One to four of these side surfaces can be used as the light incident surfaces. In an example shown in FIG. 8A, one side surface of the light guide plate 1100 is the light incident surface 1130, and thus the linear light sources 100 are disposed to face the light incident surface 1130.

Figure 9:
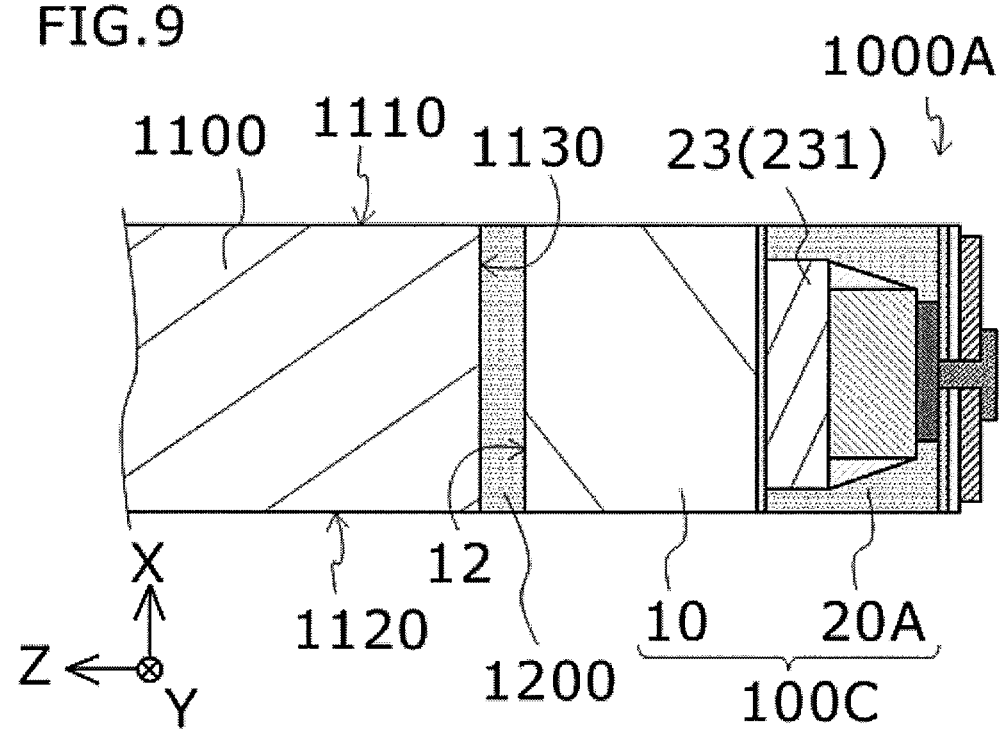
FIG. 9 is a schematic cross-sectional view showing an example of a planar light emitting device according to an embodiment of the present disclosure.

The light incident surface 1130 of the light guide plate 1100 is disposed to face the second main surface 12 of the linear light source 100, but in this case, a light-transmissive member may be sandwiched between the light incident surface 1130 and the second main surface 12 as shown in FIG. 9. Such a member can use an optical sheet 1200, such as a wavelength conversion sheet containing a phosphor or a diffusion sheet containing a light diffusing agent. In an example shown in FIG. 9, the light-transmissive member 23 used in the light emitting device 20A of the linear light source 100C is the first light-transmissive member 231 that does not substantially contain a phosphor, while a wavelength conversion sheet is used as the optical sheet 1200. Such a wavelength conversion sheet may contain, for example, a quantum dot phosphor. The optical sheet 1200 may be attached to the second main surface 12 of the linear light source 100C, or may be attached to the light incident surface 1130 of the light guide plate 1100. As the diffusion sheet, a sheet containing a resin material as a base material and a light diffusing material such as $Al_2O_3$, $SiO_2$, or $TiO_2$ can be used.

The light guide plate 1100 can have substantially the same thickness across its entire surface. That is, the first plane 1110 and the second plane 1120 can be parallel planes. Alternatively, the light guide plate 1100 may be a light guide plate in which the first plane 1110 and the second plane 1120 are not parallel to each other, that is, a light guide plate that does not have a constant thickness. Alternatively, the light guide plate 1100 used here may be a light guide plate that has one light incident surface 1130, wherein the thickness of the light guide plate on the light incident surface 1130 side is large, while the thickness thereof on the side opposite to the light incident surface 1130 is small.

Preferably, the thickness of the light guide plate 1100 is substantially the same as the thickness of the second main surface 12 of the linear light source 100 (the width in the X direction). For example, when the thickness of the second main surface 12 of the linear light source 100 is 0.3 mm, the thickness of the light incident surface 1130 of the light guide plate 1100 can be 0.28 mm to 0.32 mm.

The size of the light guide plate 1100 can be, for example, about 2 cm to about 40 cm on one side, and is preferably about 3 cm to about 15 cm on one side. The planar shape of the light guide plate 1100 can be, for example, a substantially rectangular shape, a substantially circular shape, or the like. The light guide plate 1100 may be formed of a single layer or alternatively may be formed by stacking a plurality of light-transmissive layers.

Examples of the material usable for the light guide plate 1100 include resin materials, such as thermoplastic resins and thermosetting resins, and optically transparent materials such as glass. Examples of the thermoplastic resins include acrylic resin, polycarbonates, cyclic polyolefins, polyethylene terephthalate, polyesters, and the like, whereas examples of the thermosetting resins include epoxy resins, silicone resins, and the like. In particular, the thermoplastic resin material is preferred because it can be used to efficiently produce the light guide plate 1100 by injection molding. Among them, a polycarbonate is preferred because of its high transparency and low cost.

What is claimed is:

1. A linear light source comprising:
a light-transmissive base having a first main surface that has a rectangular shape with long sides and short sides, a second main surface located opposite to the first main surface, a first side surface continuous with the long side of the first main surface, and a second side surface continuous with the short side of the first main surface;
a plurality of light emitting devices, each of the light emitting devices including a light emitting element that includes a semiconductor stack and electrodes, a light-transmissive member disposed on a light emitting surface side of the light emitting element, and a sealing member covering a side surface of the light emitting element and a side surface of the light-transmissive member, each of the light emitting devices having an upper surface that has a rectangular shape with long sides and short sides, a lower surface at which the electrode is exposed and being located opposite to the upper surface, a long side surface continuous with the long side of the upper surface, and a short side surface continuous with the short side of the upper surface, wherein the upper surface of each of the light emitting devices includes an upper surface of the light-transmissive member;
a first bonding member that bonds the first main surface of the light-transmissive base and the upper surfaces of the light emitting devices; and
a wiring board including wiring portions which are electrically connected to the electrodes of the light emitting devices,
wherein a width of the light-transmissive base is the same as a width of the light emitting devices in X direction orthogonal to the first side surface of the light-transmissive base, and
wherein a width of the each of the light emitting devices in Z direction orthogonal to the second main surface of the light-transmissive base is smaller than a width of the light-transmissive base in the Z direction and larger than a width of the wiring board in the Z direction.

2. A linear light source according to claim 1, comprising:
a second bonding member which bonds the wiring board and the lower surfaces of the light emitting devices.

3. A linear light source according to claim 1, wherein
the light-transmissive base is rectangular parallelepiped;
the light emitting device is rectangular parallelepiped;
the upper surface of at least one of the plurality of light emitting devices further includes an upper surface of the sealing member; and
a width of the short sides of the first main surface of the light-transmissive base is the same as a width of the short sides of the upper surface of the light emitting device.

4. A linear light source according to claim 1, wherein at least two adjacent ones of the plurality of light emitting devices are in contact with each other.

5. A linear light source according to claim 1, wherein at least one of the plurality of light emitting devices is arranged spaced apart from an adjacent one of the plurality of light emitting devices.

6. A linear light source according to claim 1, wherein the first main surface of the light-transmissive base comprises a convex portion between adjacent ones of the plurality of light emitting devices.

7. A planar light emitting device comprising
the linear light source according to claim 1; and
a light guide plate having a first plane, a second plane opposite to the first plane, and side surfaces continuous with the first plane and the second plane and face the second main surface of the light-transmissive base.

8. A linear light source according to claim 5, further comprising a light reflective member,
wherein the plurality of light emitting devices are spaced apart from each other, and
wherein the light reflective member is disposed between adjacent light emitting devices.

9. A linear light source according to claim 8, wherein the light reflective member is disposed to cover at least 50% of an exposed area of the first main surface of the light-transmissive base between adjacent light emitting devices.

10. A linear light source according to claim 8, wherein the light reflective member is disposed to cover the entire area of the first main surface of the light-transmissive base between adjacent light emitting devices.

11. A linear light source according to claim 8, wherein the light reflective member is disposed to cover at least 50% of the area of the side surface of each light emitting device.

12. A linear light source according to claim 8, wherein the light reflective member is provided to embed the entire space between the adjacent light emitting devices.

13. A linear light source according to claim 8, wherein the light reflective member has a reflectance of 60% or more for the light emitted from the light emitting devices.

14. A linear light source according to claim 6, wherein the width of the convex portion is at least 10% of the width of the first main surface of the light-transmissive base in the X direction.

15. A linear light source according to claim 6, wherein the widths of all the convex portions in Y direction orthogonal to the second side surface of the light-transmissive base are the same.

16. A linear light source according to claim 1, wherein a side surface of the each light emitting device is coplanar with a side surface of the light-transmissive base in the Y direction.

17. A linear light source according to claim 5, wherein a side surface of the each light emitting device is coplanar with a side surface of the light-transmissive base in the Y direction.

18. A linear light source according to claim 6, wherein a side surface of the each light emitting device is coplanar with a side surface of the light-transmissive base in the Y direction.

19. A linear light source according to claim 6, comprising a light reflective member disposed on the upper surface of the convex portion,
wherein the height of the light emitting devices is the same as the height of the light reflective member in the Z direction.

20. A linear light source according to claim 1, wherein each of the plurality of light emitting devices does not include a rigid substrate.

* * * * *